US010331319B2

(12) United States Patent
Travis et al.

(10) Patent No.: US 10,331,319 B2
(45) Date of Patent: Jun. 25, 2019

(54) OBJECTS ALIGNMENT AND DISTRIBUTION LAYOUT

(71) Applicant: Adobe Inc., San Jose, CA (US)

(72) Inventors: Robert Christopher Travis, San Francisco, CA (US); Tomas Krcha, San Francisco, CA (US); Narciso Batacan Jaramillo, Piedmont, CA (US); Talin Chris Wadsworth, Castro Valley, CA (US); Sylvain Pierre Galineau, Seattle, WA (US); Lawrence Hsu, San Mateo, CA (US); Anirudh Sasikumar, Dublin, CA (US)

(73) Assignee: Adobe Inc., San Jose, CA (US)

( * ) Notice: Subject to any disclaimer, the term of this patent is extended or adjusted under 35 U.S.C. 154(b) by 334 days.

(21) Appl. No.: 15/197,547

(22) Filed: Jun. 29, 2016

(65) Prior Publication Data

US 2018/0004401 A1 Jan. 4, 2018

(51) Int. Cl.
*G06F 3/048* (2013.01)
*G06F 3/0484* (2013.01)
*G06F 3/0489* (2013.01)
*G06F 3/0488* (2013.01)

(52) U.S. Cl.
CPC ........ *G06F 3/04845* (2013.01); *G06F 3/0489* (2013.01); *G06F 3/04883* (2013.01)

(58) Field of Classification Search
CPC ............. H04N 13/239; H04N 1/00411; H04N 1/00424; H04N 1/00506; G06F 3/0482; G06F 3/0236; G06F 3/0325; G06F 3/04817

See application file for complete search history.

(56) References Cited

U.S. PATENT DOCUMENTS

| 5,796,401 A * | 8/1998 | Winer | G06T 11/60 345/619 |
| 6,121,963 A * | 9/2000 | Ange | G06F 16/40 715/202 |
| 6,144,974 A * | 11/2000 | Gartland | G06T 11/60 715/205 |
| 6,295,066 B1 * | 9/2001 | Tanizaki | G06T 17/00 345/419 |
| 6,323,879 B1 * | 11/2001 | Sauerbrei | G06T 19/20 345/442 |

(Continued)

*Primary Examiner* — Linh K Pham
(74) *Attorney, Agent, or Firm* — SBMC

(57) ABSTRACT

In embodiments of objects alignment and distribution layout, an object layout interface includes objects displayed for selection and manipulation. A layout algorithm receives a reposition input for a selected object in the object layout interface, and determines a distribution layout and/or an alignment layout of the objects. The layout algorithm positions the selected object equidistant between at least two of the objects or at a distance from a closest one of the objects, the distance being an equivalent distance of a space between the at least two objects. The space between the objects is displayed as positive space that visually indicates the equidistance between the objects. Alternatively or in addition, the layout algorithm positions the selected object in alignment with multiple objects, and an alignment indication, such as an edge line and/or a distance measurement, is displayed for each instance of the selected object being aligned with the multiple objects.

20 Claims, 12 Drawing Sheets

(56) References Cited

U.S. PATENT DOCUMENTS

| | | | |
|---|---|---|---|
| 7,973,807 B2* | 7/2011 | Mielke | G06F 16/9577 345/642 |
| 7,996,765 B1* | 8/2011 | Mitnick | G06F 17/2247 715/235 |
| 7,996,780 B1* | 8/2011 | Mitnick | G06F 8/38 715/760 |
| 8,086,958 B2* | 12/2011 | Tokunaga | G06F 17/211 715/205 |
| 8,484,570 B2* | 7/2013 | Konar | G06F 3/04812 345/662 |
| RE44,504 E* | 9/2013 | Schultz | G01C 9/28 33/1 G |
| 8,612,849 B2* | 12/2013 | Boreham | G06F 17/211 715/243 |
| 8,726,186 B2* | 5/2014 | Grosz | G06K 9/6267 715/800 |
| 9,152,292 B2* | 10/2015 | Xiao | G06F 3/0481 |
| 9,183,006 B2* | 11/2015 | Turcotte | G06F 9/451 |
| 9,412,186 B2* | 8/2016 | Mullen | G06T 11/206 |
| 9,513,765 B2* | 12/2016 | Miyazaki | G06F 3/041 |
| 9,817,794 B2* | 11/2017 | Marseille | G06F 17/243 |
| 2004/0066407 A1* | 4/2004 | Regan | G06F 3/0481 715/764 |
| 2005/0240877 A1* | 10/2005 | Baudisch | G06F 3/0481 715/764 |
| 2007/0002377 A1* | 1/2007 | Tokunaga | G06F 17/211 358/1.18 |
| 2008/0250338 A1* | 10/2008 | Konar | G06F 3/04812 715/767 |
| 2008/0256484 A1* | 10/2008 | Kraft | G06F 3/04812 715/799 |
| 2010/0318899 A1* | 12/2010 | Kitada | H04N 1/3872 715/243 |
| 2011/0300936 A1* | 12/2011 | Matsumiya | G06T 15/503 463/32 |
| 2013/0055055 A1* | 2/2013 | Turcotte | G06F 9/4443 715/201 |
| 2014/0298163 A1* | 10/2014 | Bank | G06F 17/211 715/235 |
| 2016/0266770 A1* | 9/2016 | Breedvelt-Schouten | G06F 3/04842 |
| 2016/0364564 A1* | 12/2016 | Lee | G06F 21/36 |
| 2017/0040036 A1* | 2/2017 | Ryu | G11B 27/031 |

* cited by examiner

OBJECTS ALIGNMENT AND DISTRIBUTION LAYOUT

BACKGROUND

Many device users have electronic and computing devices, such as desktop computers, laptop computers, mobile phones, tablet computers, multimedia devices, and other similar devices. These types of computing devices are utilized for many different computing applications, such as for graphic design, publication development, and various other types of computing applications that include a user interface with displayed objects that can be moved, repositioned, aligned, and the like. However, manipulating multiple objects in a user interface so that they are aligned, centered, and/or distributed evenly, such as for a publication layout or in a graphic design, can be difficult, resulting in a poor user experience. The alignment and proximity of objects are two of the most fundamental principles of visual perception and design, as they are used to convey relationships between the objects.

Conventional distribution and alignment snapping in design tools are not comprehensive, can be unpredictable, inconsistent, and typically increase visual noise in the user interface. A clutter of indicators are distractions without giving the user more or accurate information about the object layout. It can be difficult for a user to design and layout objects precisely when not being able to determine exactly how far apart objects are when spacing the objects, or whether objects are exactly aligned. Often the distribution and/or alignment indicators in design tools may be too small to convey useful user information, particularly when the objects are large in comparison. Further, distance measurement labels may cover over parts of the objects, may be ambiguous as to the identified distance, may be missing or only partially displayed, or the indicators may be clipped outside of the viewable area of the user interface altogether.

SUMMARY

This Summary introduces features and concepts of objects alignment and distribution layout, which is further described below in the Detailed Description and/or shown in the Figures. This Summary should not be considered to describe essential features of the claimed subject matter, nor used to determine or limit the scope of the claimed subject matter.

Objects alignment and distribution layout is described. In embodiments, a computing device displays an object layout interface that includes objects displayed for user selection and manipulation, such as to select and reposition or move a displayed object in the object layout interface. The computing device implements a layout algorithm as a computer application that can receive a reposition input, such as initiated by a user, and the reposition input repositions a selected object in the object layout interface. The layout algorithm determines a distribution layout of the objects based on the reposition input of the selected object. The reposition input of the selected object can be initiated by a user of the computing device and may be received as a touch-selection of the object, as an input device selection of the object, or as keyboard arrow keys inputs. Further, the reposition input that is received as a user selection of the object will generally reposition the object so that it is approximately aligned and/or distributed with the other displayed objects in the object layout interface.

The layout algorithm can then further move or position the object for accurate alignment and/or distribution with the other displayed objects subsequent to the received position input. Based on the determined distribution layout of the objects, the layout algorithm can position the selected object equidistant between at least two of the other displayed objects, or at a distance from a closest one of the objects, where the distance is an equivalent distance of a space between the other two objects. The layout algorithm positioning the selected object can include moving the selected object subsequent to the received reposition input (e.g., after the user reposition input is received). The layout algorithm may be limited in moving the selected object not more than a predefined number of pixels subsequent to the received reposition input. Further, the number of pixels that a selected object is allowed to move after a reposition input may be constrained based on the input method of the reposition input.

The space between the selected object and the other distributed objects can be displayed as positive space that visually indicates the equidistance between the objects. For example, the space between the distributed objects can be indicated visually as positive space by filling-in the space with a solid color, a line pattern, a graphic, and/or with any other visual indication of positive space. Additionally, a distance measurement can be displayed that numerically indicates the equidistance between the selected object and each of the other distributed objects that the selected object is next to or distributed between. In addition to a selected object being distributed equidistant between or with other objects displayed in the object layout interface, the layout algorithm can also determine an alignment layout of the objects based on the reposition input of the selected object.

The layout algorithm can align the selected object with multiple ones of the other displayed objects and position at least one edge of the selected object in alignment along an axis with an edge of each of the other objects. The edges of an object include vertical edges (e.g., right and left side edges), a vertical center, horizontal edges (e.g., top and bottom edges), and a horizontal center of the object. The vertical edges and the horizontal edges of an object are also referred to herein as the border edges of the object. The selected object can be edge-aligned with any of the other objects based on any one or more of the edges of the selected object being aligned with any one or more of the edges of the other objects. In implementations, the alignment layout is determined by the layout algorithm subsequent to the distribution layout, and the selected object can be distributed and then edge-aligned (to include center-aligned) with other objects in the object layout interface.

In other aspects of objects alignment and distribution layout, the layout algorithm can receive a reposition input that repositions a selected object in the object layout interface, and determine an alignment layout of the objects based on the reposition input of the selected object. The determined alignment layout can include at least one edge of the selected object being aligned along an axis with an edge of each of multiple ones of the other objects, where edges of an object include vertical edges, a vertical center, horizontal edges, and a horizontal center of the object. As noted above, the reposition input that is received as a user selection of the object will generally reposition the object so that it is approximately aligned and/or distributed with the other displayed objects in the object layout interface.

The layout algorithm can then further move or position the object for accurate alignment and/or distribution with the other displayed objects subsequent to the received reposition input. Based on the determined alignment layout of the objects, the layout algorithm can position the selected object in alignment with the multiple objects based on the determined alignment layout of the objects. The layout algorithm positioning the selected object in alignment with the multiple objects can include the layout algorithm moving the selected object into the alignment layout with the multiple objects subsequent to the received reposition input (e.g., after the user reposition input is received). The layout algorithm may be limited in moving the selected object not more than a predefined number of pixels subsequent to the received reposition input. Further, the number of pixels that a selected object is allowed to move after a reposition input may be constrained based on the input method of the reposition input.

An alignment indication for each instance of the selected object being aligned with the edge of each of the other objects can be displayed. For example, the alignment indication for each instance of object alignment is an edge line extending along the axis of the edge of the selected object and the aligned edge of each of the multiple objects. Further, the number of display items on the object layout interface can be minimized by combining overlapping edge lines, such as to minimize clutter on the display. Additionally, the alignment indication for each instance of object alignment can include a distance measurement that numerically indicates a distance between the selected object and each of the multiple objects along the axis of the aligned edges of the respective objects. Alternatively or in addition, the alignment indication for each instance of object alignment is a center line extending through centers of the respective objects. As noted above, the alignment layout can be determined by the layout algorithm subsequent to a distribution layout, and the selected object can be distributed and then edge-aligned with the other objects.

BRIEF DESCRIPTION OF THE DRAWINGS

Embodiments of objects alignment and distribution layout are described with reference to the following Figures. The same numbers may be used throughout to reference like features and components that are shown in the Figures.

DETAILED DESCRIPTION

Figure 1:
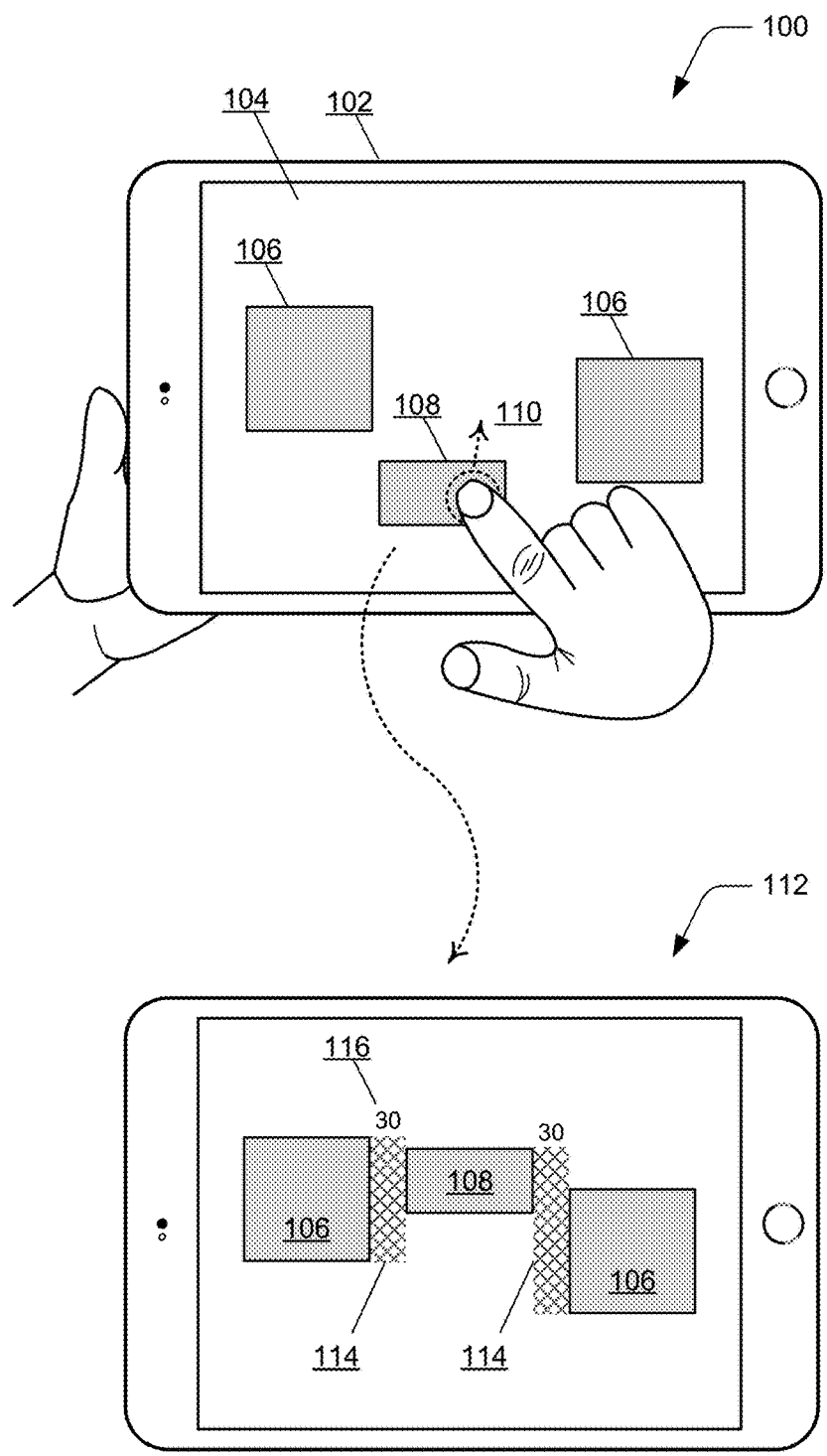
FIGS. 1-6 illustrate examples of objects alignment and distribution layout implemented with a mobile computing device in accordance with one or more embodiments as described herein.

Embodiments of objects alignment and distribution layout are described, and the techniques enable a user to select, move, and reposition objects that are displayed in an object layout interface. The objects can be precisely aligned and/or distributed automatically in a predictable manner with relevant information about an alignment or distribution displayed in an understandable, concise layout. Many different types of computer applications utilize or implement object layout features or functions that provide for moving, repositioning, resizing, rotating, distributing, and aligning objects, such as in drawing applications, for graphic design, publication layouts, artistic uses, commercial and private uses, etc. Any type of computing device can be used to implement a layout algorithm as a module, component, software application, etc. of a computer application that generates an object layout interface for display with displayed objects.

In embodiments, the object layout interface can include multiple objects that are displayed, and a layout algorithm can receive a reposition input of an object (or group of the objects). A reposition input can be received with a touch selection of an object in the object layout interface, with an input device (e.g., a mouse or stylus) selection of the object, with keyboard arrow key inputs, or with other types of computer inputs to reposition the object in the layout. The layout algorithm can then determine a distribution layout and/or an alignment layout of the displayed objects based on the reposition input of the selected object, or group of objects.

In the described techniques, the layout algorithm can determine the distribution layout of the objects (also referred to as distribution snapping) and then position a selected object equidistant between at least two of the other displayed objects or at a distance from a closest one of the objects, where the distance is an equivalent distance of a space between the other two objects. The space between each of the distributed objects can be displayed as positive space that visually indicates the equidistance between the objects, such as by filling-in the space with a solid color, a line pattern, a graphic, and/or with any other visual indication of positive space that indicates the spatial relationships of the distributed objects. Additionally, distance measurements can be displayed that numerically indicate the equidistance between the distributed objects.

Further, in the described techniques, the layout algorithm can determine the alignment layout of the objects (also referred to as alignment snapping) and position the selected object in alignment with other displayed objects. An alignment indication for each instance of the selected object being aligned with the edge of each of the other objects can also be displayed. For example, an alignment indication for each instance of object alignment can be an edge line extending along the axis of the edge of the selected object and the aligned edge of each of the other objects. Additionally, the alignment indication for each instance of object alignment can include a distance measurement that numerically indicates a distance between the aligned objects along the axis of the aligned edges of the respective objects. Alternatively or in addition, an alignment indication for each instance of object alignment is a center line between the selected object and the aligned objects extending through centers of the respective objects. In implementations, the alignment layout can be determined by the layout algorithm subsequent to the distribution layout, and a selected object can be distributed and then edge-aligned with the other displayed objects.

While features and concepts of objects alignment and distribution layout can be implemented in any number of different devices, systems, networks, environments, and/or configurations, embodiments of objects alignment and distribution layout are described in the context of the following example devices, systems, and methods.

FIG. 1 illustrates an example 100 of objects alignment and distribution layout, implemented with a mobile device, such as a tablet device 102 shown in this example or a mobile phone, although the techniques described herein may be implemented with any computing device. As detailed in the system description shown in FIG. 5, the tablet device 102 can display an object layout interface 104 of a computer application that is implemented by a computing device. For example, many different types of computer applications utilize or implement object layout features or functions that provide for moving, repositioning, resizing, rotating, distributing, and aligning objects, such as in drawing applications, for graphic design, publication layouts, artistic uses, commercial and private uses, etc.

In this example 100, the object layout interface 104 displays multiple objects 106, 108 of various dimensions and in various layouts. The objects are displayed for user selection and manipulation, such as to select and reposition or move a displayed object in the object layout interface. Although the examples described herein are illustrated in the figures as a graphic design object layout that has objects of different sizes, the described techniques of objects alignment and distribution layout can be applied to objects of different shapes and sizes, objects of the same shape and size, as well as to groups of the various objects. A user may initiate a reposition input 110 of an object 108 (or group of objects) in the object layout interface 104, such as with a touch selection of the object as shown. Alternatively, a reposition input can be initiated with an input device (e.g., a mouse or stylus) selection of the object, with keyboard arrow key inputs, or with other types of computer inputs to reposition the object 108 in the object layout interface. Generally, a reposition input 110 that is received as a user selection of the object 108 will reposition the object so that it is approximately aligned and/or distributed with the other displayed objects in the object layout interface.

As described herein, a selected object 108 can be repositioned, such as moved in the object layout interface 104, and a layout algorithm determines a distribution layout and/or an alignment layout of the objects 106, 108 based on the reposition input 110 of the selected object. In embodiments, and as further detailed in the system description shown in FIG. 5, the tablet device 102 implements a layout algorithm (e.g., as a module, a component, a software application, etc.) of the computer application that generates the object layout interface 104. The layout algorithm is designed to respond to the reposition input 110 of the selected object 108, and determine the distribution layout and/or the alignment layout of the objects. Additionally, and in the event that the reposition input 110 of the selected object 108 as initiated by the user does not exactly align and/or distribute the objects 106, 108, the layout algorithm can then further move or position the object 108 for accurate alignment and/or distribution with the other displayed objects 106.

In the described techniques, the layout algorithm can determine a distribution layout of the objects (also referred to as distribution snapping), and as shown at 112, position the selected object 108 equidistant between the other two objects 106. If more than three objects are displayed in the object layout interface, then the selected object 108 can be similarly positioned equidistant between at least two of the other displayed objects. Positioning the selected object 108 equidistant between the other two displayed objects 106 can include the layout algorithm moving the selected object subsequent to the received reposition input 110 (e.g., after the user reposition input is received). The layout algorithm may be limited in moving the selected object 108 not more than a predefined number of pixels of the user interface display subsequent to the received reposition input. The number of pixels that the selected object 108 is allowed to move after a reposition input may also be constrained based on the input method. For example, after a reposition input with keyboard arrow keys, the selected object 108 may not be allowed to move, but rather is maintained at the current position where alignment and/or distribution matches with other objects, if any, are determined.

The space between the selected object 108 and the other distributed objects 106 can be displayed as positive space 114 that visually indicates the equidistance between the objects. For example, the space between the distributed objects can be indicated visually as the positive space 114 by filling-in the space with a solid color, a line pattern, a graphic, and/or with any other visual indication of positive space. This helps the user visualize the spatial relationships of the distributed objects. Additionally, distance measurements 116 can be displayed that numerically indicate the equidistance between the selected object 108 and each of the other distributed objects 106 that the selected object is next to or distributed between. The distance measurements 116 are displayed in the object layout interface 104 where they will be visible to the user, but not obscure the displayed objects or distribution indications.

Figure 2A:
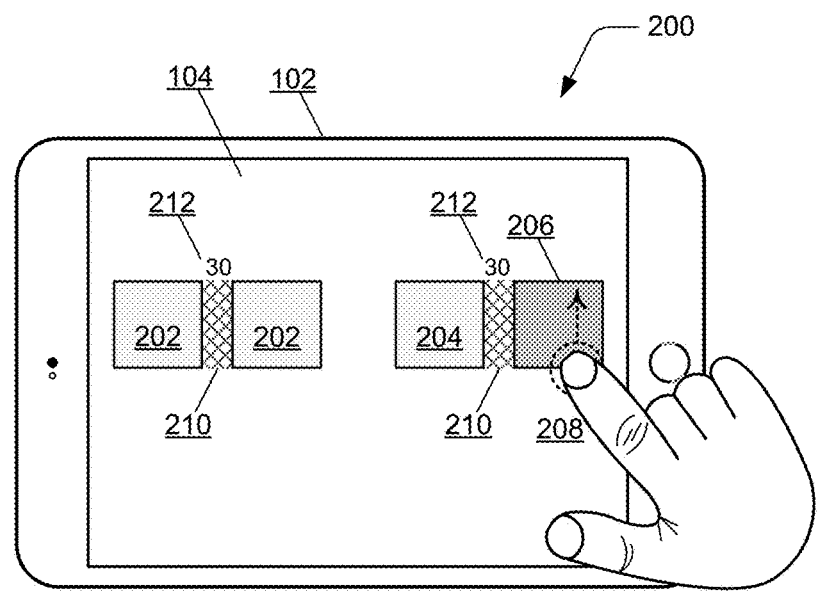
Figure 2B:
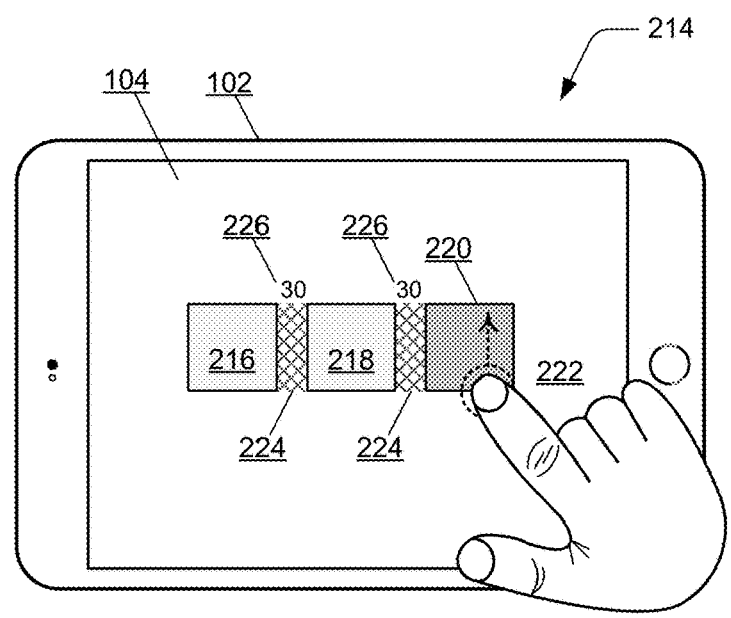

FIGS. 2A and 2B further illustrate examples of distribution layout of the objects (also referred to as distribution snapping), implemented with the tablet device 102 (e.g., a mobile device, computing device) as shown and described with reference to FIG. 1. In an example 200 shown in FIG. 2A, the object layout interface 104 displays multiple objects 202, 204, and 206. The various objects are displayed for user selection and manipulation, such as to select and reposition or move a displayed object in the object layout interface. A user may initiate a reposition input 208 of the displayed object 206 (or group of objects) in the object layout interface 104. As noted above, the reposition input 208 can be received with a touch selection of an object, with an input device (e.g., a mouse or stylus) selection of the object, with keyboard arrow key inputs, or with other types of computer inputs, to reposition the object 206 in the layout. Generally, a reposition input 208 that is received as a user selection of the object 206 will reposition the object so that it is approximately aligned and/or distributed with the other displayed objects in the object layout interface.

In the example 200, the objects 202 are initially displayed on the object layout interface 104 with a space between the objects. As the object 206 is repositioned near the displayed object 204, the layout algorithm can determine a distribution layout of the objects, and position the object 206 at a distance from the object 204 that is the same distance as the space between the adjacent objects 202. In this implementation of distribution snapping, the repositioned object 206 snaps to the closest object 204 at the same distance of the space between the other two displayed objects 202. The space between the objects 206 and 204 is equidistant to the space between the two objects 202. The space between the objects can be displayed as positive space 210 that visually indicates the equidistance between the objects. For example, the positive space 210 between the distributed objects can be indicated visually by filling-in the space with a solid color, a line pattern, a graphic, and/or with any other visual indication of positive space to visually represent the spatial relationships of the distributed objects. Additionally, distance measurements 212 can be displayed that numerically indicate the equidistance of the space between the selected object 206 and the displayed object 204, and the space between the two objects 202. The distance measurements 212 are displayed in the object layout interface 104 where they will be visible to the user, but not obscure the displayed objects or distribution indications.

In another example 214 shown in FIG. 2B, the object layout interface 104 displays multiple objects 216, 218, and 220. The objects are displayed for user selection and manipulation, such as to select and reposition or move a displayed object in the object layout interface. A user may initiate a reposition input 222 of the displayed object 220 in the object layout interface 104. In the example 214, the objects 216 and 218 are initially displayed on the object layout interface 104 with a space between them. As the object 220 is repositioned near the displayed object 218, the layout algorithm can determine a distribution layout of the objects, and position the object 220 at a distance from the object 218 that is the same distance as the space between the adjacent objects 216 and 218. In this implementation of distribution snapping, the repositioned object 220 snaps to the closest object 218 at the same distance of the space between the objects 216 and 218. The space between the two objects 218 and 220 is equidistant to the space between the two objects 216 and 218. The spaces between the objects can be displayed as positive space 224 that visually indicates the equidistance between the objects. As noted above, the positive space 210 between the distributed objects can be indicated visually by filling-in the space with a solid color, a line pattern, a graphic, and/or with any other visual indication of positive space to visually represent the spatial relationships of the distributed objects. Additionally, distance measurements 226 can be displayed that numerically indicate the equidistance of the spaces between the objects.

Figure 3A:
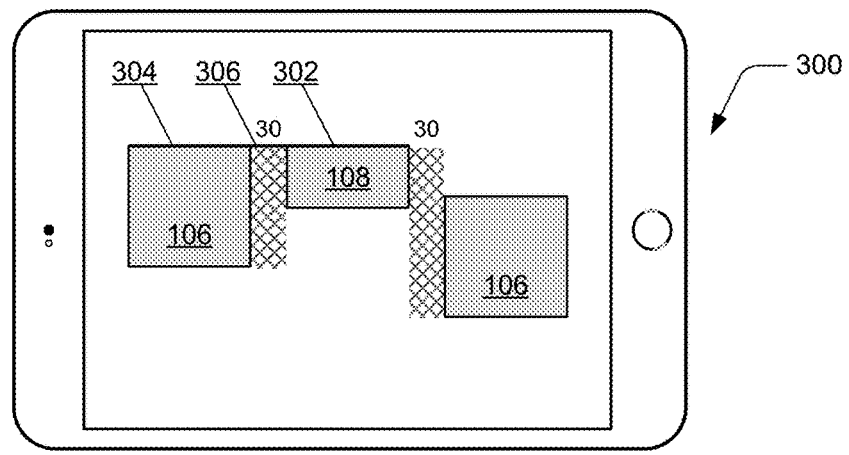
Figure 3A:
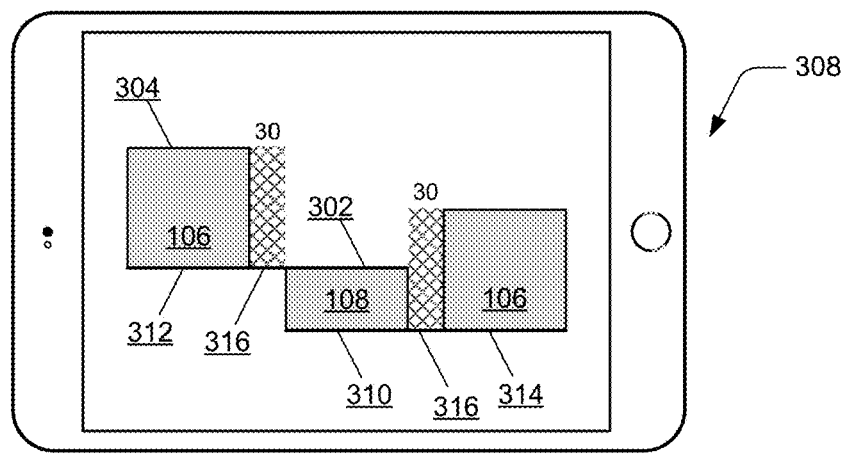

FIG. 3A illustrates that, in addition to the selected object 108 (as shown in FIG. 1) being distributed equidistant between the other displayed objects 106 in the object layout interface 104, the layout algorithm can also determine an alignment layout (e.g., an edge-alignment layout) of the objects 106, 108 based on the reposition input 110 of the selected object, as described above with reference to FIG. 1. In an example 300, at least one edge 302 of the selected object 108 is aligned with a respective edge 304 of another displayed object 106, and an alignment indication 306 for each instance of the selected object 108 being aligned with one or more of the other objects can be displayed. The edges of an object include vertical edges (e.g., right and left side edges), a vertical center, horizontal edges (e.g., top and bottom edges), and a horizontal center of the object. The vertical edges and the horizontal edges of an object are also referred to herein as the border edges of the object. The selected object 108 can be edge-aligned with any of the other objects 106 based on any one or more of the edges of the selected object being aligned with any one or more of the edges of the other objects.

For example, the alignment indication 306 for each instance of object alignment in the example 300 is an edge line extending along an axis of the edge 302 of the selected object 108 and the aligned edge 304 of the object 106, where the edge line extends along the aligned edges 302, 304 of the respective objects. In implementations, all alignment matches with the selected object 108 are displayed even if the alignment occurs due to keyboard interaction nudges (e.g., by input of the keyboard arrow keys), or when a distribution snap has occurred and additional movement on an axis is not allowed. This also includes multiple matches along an axis of a displayed object, aligning on the top and bottom edges of the object, or multiple matches along an edge of the displayed object, such as if the top edge aligns to two or more of the other displayed objects.

In another similar example 308, multiple edges 302, 310 of the selected object 108 are aligned with edges 312, 314 of the other displayed objects 106. Alignment indications 316 (e.g., edge lines) are also displayed for each instance of the selected object 108 being edge-aligned with the other objects 106. For example, the alignment indications 316 for each instance of object alignment in the example 308 is an edge line extending along the axis of each edge 302, 310 of the selected object 108 and the aligned edges 312, 314 of each of the respective objects 106. Although the alignment indications 306 (in example 300) and 316 (in example 308) are shown as solid lines of a black color, the alignment indications (e.g., the edge lines) may be represented and displayed as solid or dashed lines of various patterns, and in implementations, may be displayed in a different color or colors other than black.

Figure 3B:
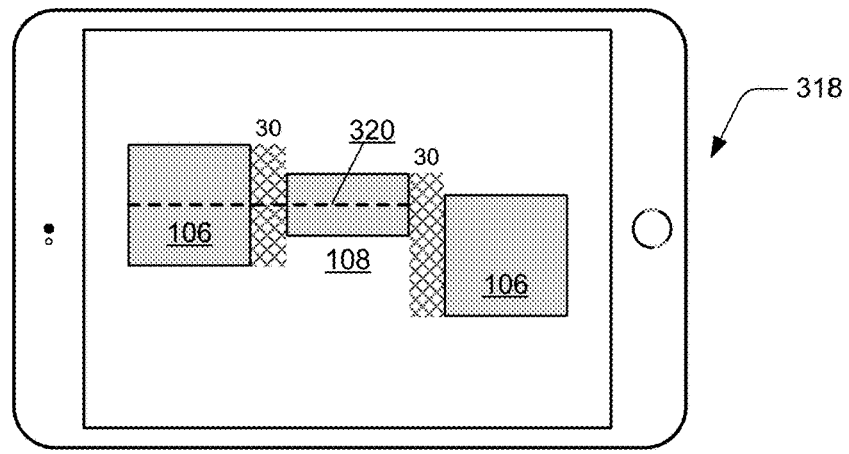

FIG. 3B illustrates that, in addition to the selected object 106 being distributed equidistant between the other distributed objects 106 displayed in the object layout interface 104, the layout algorithm can also determine an alignment layout (e.g., a center-alignment layout) of the objects 106, 108 based on the reposition input 110 of the selected object, as described above with reference to FIG. 1. In the example 318, the selected object 108 is center-aligned with a center of another object 106, and an alignment indication 320 can be displayed for each instance of the selected object 108 being aligned with one or more of the other objects. As noted above, a vertical or horizontal center of an object is considered as an edge of the object for objects alignment and distribution layout.

For example, the alignment indication 320 for each instance of object alignment in the example 318 is a center line extending through the horizontal center of the selected object 108 and the aligned object 106. Although the alignment indication 320 is shown as a dashed line of a black color, the alignment indication (e.g., the center line) may be represented and displayed as solid or dashed line of various patterns, and in implementations, may be displayed in a different color or colors other than black. Additionally, the alignment layout can be determined subsequent to the distribution layout, and the selected object 106 can be distributed and then edge-aligned with the other displayed objects (e.g., as shown in FIGS. 3A and 3B). Object positioning conflicts between distribution snapping and alignment snapping can be resolved by the layout algorithm in a consistent manner. For example, when a distribution layout has been determined on an axis, object alignment matches that occur at the distribution snapped axis position can be displayed. The object axes are considered independently by the layout algorithm so that object distribution on one axis does not prevent alignment snapping along another axis.

Figure 4:
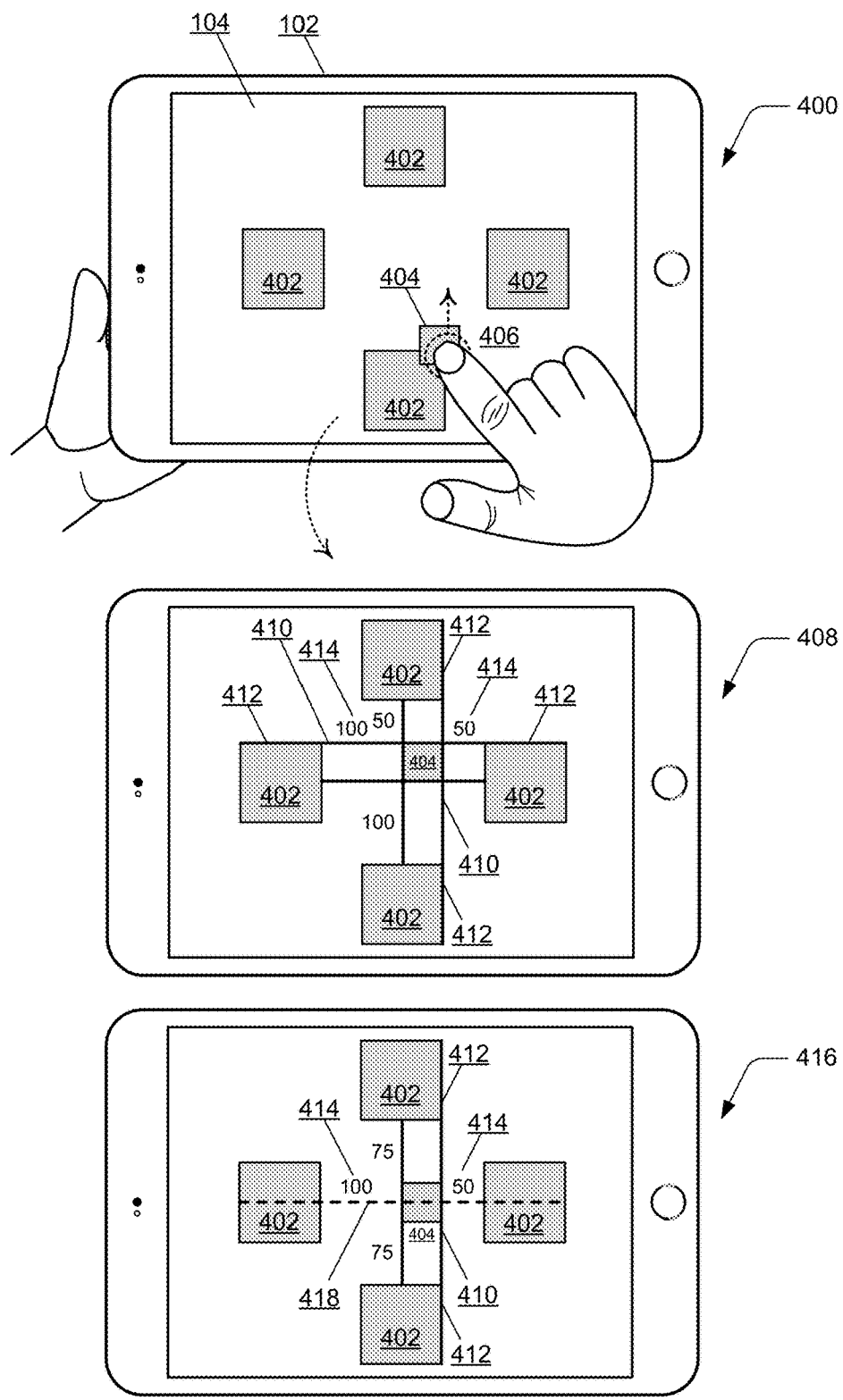

FIG. 4 illustrates an example 400 of objects alignment and distribution layout, implemented with the tablet device 102 (e.g., a mobile device, computing device) as shown and described with reference to FIG. 1. In this example 400, the object layout interface 104 displays multiple objects 402, 404 and the objects are displayed for user selection and manipulation, such as to select and reposition or move a displayed object in the object layout interface. A user may initiate a reposition input 406 of the object 404 (or group of objects) in the object layout interface 104. A reposition input can be received with a touch selection of an object, with an input device (e.g., a mouse or stylus) selection of the object, with keyboard arrow key inputs, or with other types of computer inputs, to reposition the object 404 in the layout. Generally, a reposition input 406 that is received as a user selection of the object 404 will reposition the object so that it is approximately aligned and/or distributed with the other displayed objects in the object layout interface.

As described herein, a selected object 404 can be repositioned (e.g., moved) in the object layout interface 104, and the layout algorithm determines an alignment layout (also referred to as alignment snapping) of the objects 402, 404 based on the reposition input 406 of the selected object. In the described techniques, the alignment layout of the objects 402, 404 can be determined, and the selected object 404 can be positioned in alignment with multiple other displayed objects 302 based on the determined alignment layout of the objects. The positioning of the selected object 404 in alignment with the multiple other objects 402 can include moving the selected object into alignment with the multiple objects subsequent to the received reposition input 406 (e.g., after the user reposition input is received).

As noted above, the layout algorithm may be limited in moving the selected object not more than a predefined number of pixels of the user interface display subsequent to the received reposition input. The number of pixels that the selected object 404 is allowed to move after a reposition input may also be constrained based on the input method. For example, after a reposition input with keyboard arrow keys, the selected object 404 may not be allowed to move, but rather is maintained at the current position. The alignment snapping is comprehensive, and the selected object 404 can align to the closest objects 402 on all sides. Although the alignment layouts are described with reference to a selected object, or group of objects, being aligned with the other displayed objects, a selected object may also be aligned with features of the object layout interface 104, such as the center or edges of the object layout interface itself.

An alignment indication for each instance of the selected object 404 being aligned with the multiple other objects 402 can be displayed. For example, the alignment indication 410 for each instance of object alignment can be an edge line extending along the axis of the edge of the selected object 404 and the aligned edge of each of the other objects. Additionally, the alignment indication for each instance of object alignment can include a distance measurement 414 that numerically indicates a distance between the selected object 404 and an aligned object 402 along the axis of the aligned edges 412 of the respective objects. Alternatively or in addition, as shown in the alignment layout at 416, an alignment indication 418 for each instance of object alignment is a center line between the selected object 404 and center-aligned objects 402 extending through centers of the respective objects. As noted above, the alignment layout can be determined by the layout algorithm subsequent to a distribution layout, and the selected object 404 can be distributed and then edge-aligned with the other displayed objects (e.g., as shown in the examples 408 and 416). The alignment indications are simplified to a single edge line extending along the axis of the object edges and not more than one distance annotation is displayed so as not to clutter the object layout interface of obscure the displayed objects.

Figure 5A:
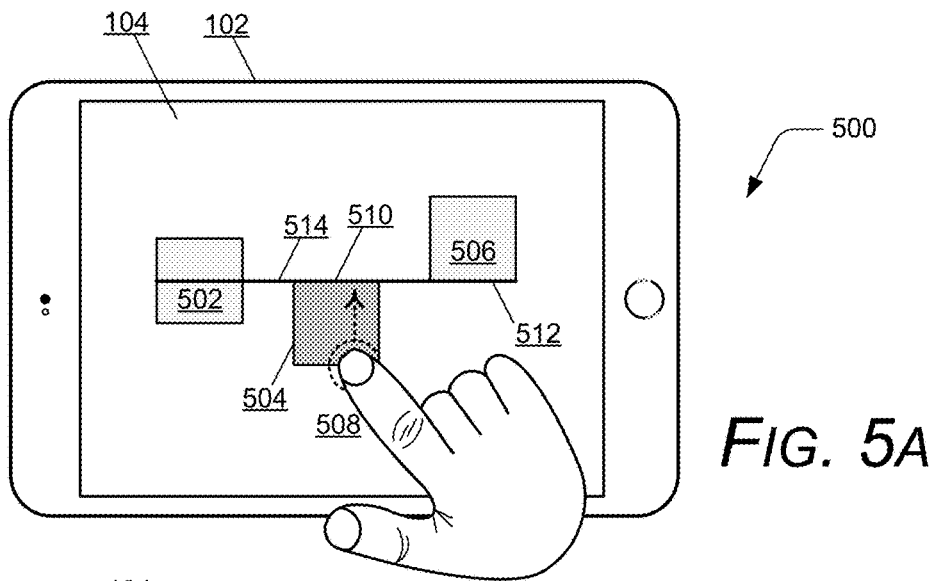
Figure 5B:
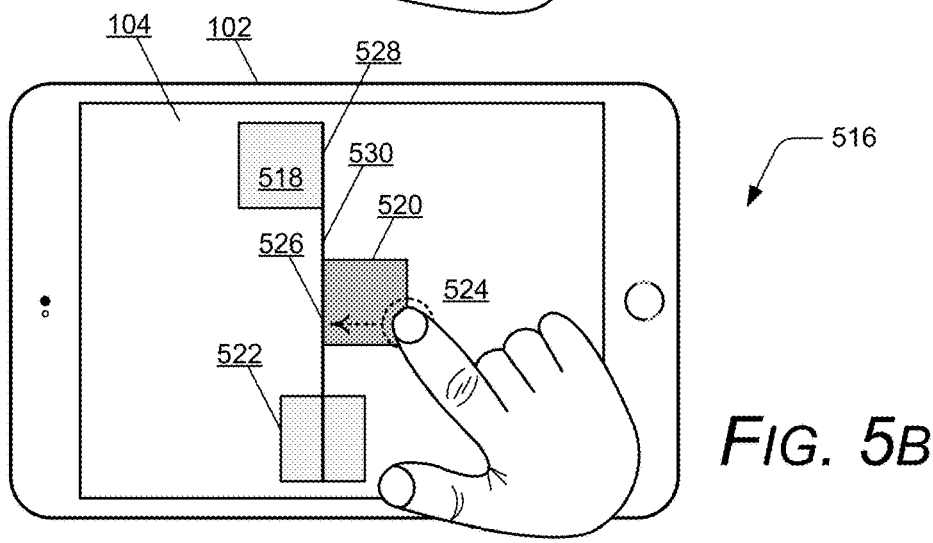
Figure 5C:
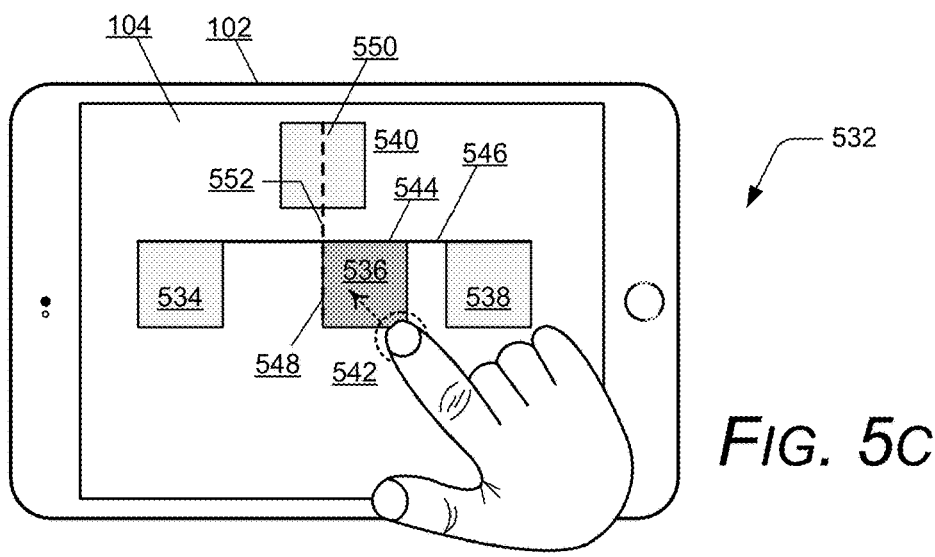

FIGS. 5A, 5B, and 5C further illustrate examples of alignment layout of the objects (also referred to as alignment snapping), implemented with the tablet device 102 (e.g., a mobile device, computing device) as shown and described with reference to FIG. 1. In an example 500 shown in FIG. 5A, the object layout interface 104 displays multiple objects 502, 504, and 506 that are horizontally aligned. The various objects are displayed for user selection and manipulation, such as to select and reposition or move a displayed object in the object layout interface. A user may initiate a reposition input 508 of the displayed object 504 (or group of objects) in the object layout interface 104. As noted above, the reposition input 508 can be received with a touch selection of an object, with an input device (e.g., a mouse or stylus) selection of the object, with keyboard arrow key inputs, or with other types of computer inputs, to reposition the object 504 in the layout. Generally, a reposition input 508 that is received as a user selection of the object 504 will reposition the object so that it is approximately aligned and/or distributed with the other displayed objects in the object layout interface.

In the example 500, as the object 504 is repositioned near the other displayed objects 502, 506, the layout algorithm can determine an alignment layout of the objects, and align the repositioned object 504 with the other displayed objects. In implementations of alignment snapping, the layout algorithm can snap-align any edge of an object to any edge of another displayed object, vertically and/or horizontally, where the center of any of the objects is also considered as an "edge" for alignment determinations. For example, a top edge 510 of the repositioned object 504 is snap-aligned with a bottom edge 512 of the displayed object 506. Additionally, the top edge 510 of the repositioned object 504 is snap-aligned with the center of the displayed object 502. Generally on the horizontal plane, the top, horizontal center, and bottom edges of the objects can be snap-aligned in an alignment layout. Further, on the vertical plane, the left, vertical center, and right edges of the objects can be snap-aligned in an alignment layout. One or more of the vertical and/or horizontal edges of an object (to include the horizontal and vertical centers of the object) can be snap-aligned to one or more of the vertical and/or horizontal edges of any number of the other displayed objects. An alignment indication of a horizontal line 514 is displayed to indicate the edge alignment of the objects 504 and 506, and the horizontal line 514 indicates the edge-to-center alignment of the respective objects 504 and 502.

In another example 516 shown in FIG. 5B, the object layout interface 104 displays multiple objects 518, 520, and 522 that are vertically aligned. The various objects are displayed for user selection and manipulation, such as to select and reposition or move a displayed object in the object layout interface. A user may initiate a reposition input 524 of the displayed object 504 (or group of objects) in the object layout interface 104. As the selected object 520 is repositioned near the other displayed objects 518, 522, the layout algorithm can determine an alignment layout of the objects, and align the repositioned object 520 with the other displayed objects. For example, a left edge 526 of the repositioned object 520 is snap-aligned with a right edge 528 of the displayed object 518. Additionally, the left edge 526 of the repositioned object 520 is snap-aligned with the center of the displayed object 522. An alignment indication of a vertical line 530 is displayed to indicate the edge alignment of the objects 518 and 520, and the vertical line 530 indicates the edge-to-center alignment of the respective objects 520 and 522.

In another example 532 shown in FIG. 5C, the object layout interface 104 displays multiple objects 534, 536, 538, and 540 that are horizontally and/or vertically aligned. The various objects are displayed for user selection and manipulation, such as to select and reposition or move a displayed object in the object layout interface. A user may initiate a reposition input 542 of the displayed object 536 in the object layout interface 104. As the selected object 536 is repositioned near the other displayed objects 534, 538, and 540, the layout algorithm can determine an alignment layout of the objects, and align the repositioned object 536 with the other displayed objects. For example, a top edge 544 (e.g., a horizontal border edge) of the repositioned object 536 is snap-aligned along the axis of the top edges of the other displayed objects 534, 538, and an alignment indication of a horizontal line 546 is displayed to indicate the edge alignment of the objects. Additionally, the left edge 548 (e.g., a vertical border edge) of the repositioned object 536 is snap-aligned with the vertical center 550 of the displayed object 540, and an alignment indication of a center line 552 is displayed to indicate the edge-to-center alignment of the respective objects 536 and 540.

Figure 6:
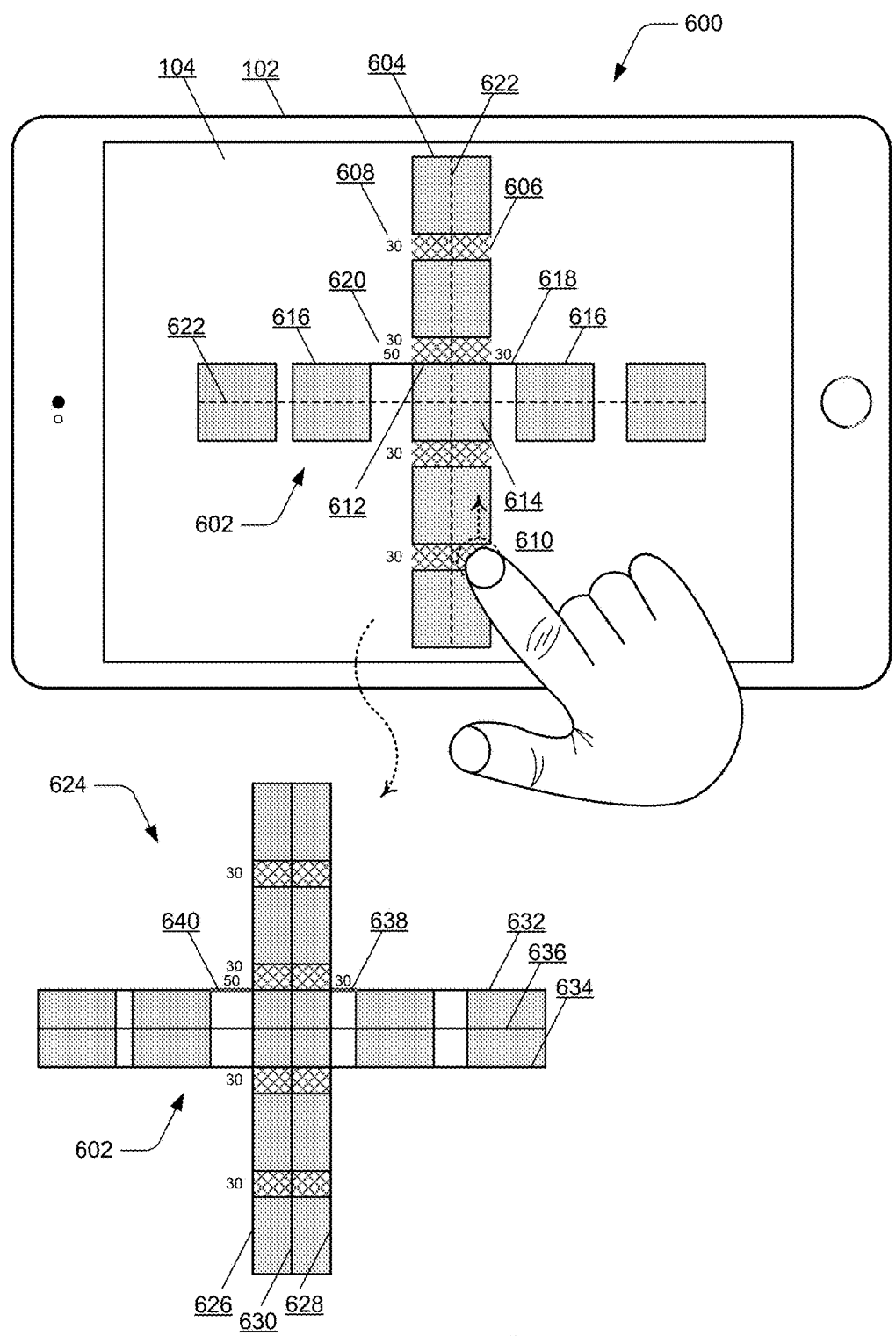

FIG. 6 illustrates another example 600 of objects alignment and distribution layout, implemented with the tablet device 102 (e.g., a mobile device, computing device) as shown and described with reference to FIG. 1. In this example 600, the object layout interface 104 displays multiple objects 602 and the objects are displayed for user selection and manipulation, such as to select and reposition or move a displayed object (or group of the objects) in the object layout interface. A user may initiate a reposition input of an object 602 in the object layout interface 104, such as with a touch selection of the object as shown. Alternatively, a reposition input can be initiated with an input device (e.g., a mouse or stylus) selection of the object, with keyboard arrow key inputs, or with other types of computer inputs, to reposition the objects in the object layout interface. The layout algorithm can determine a distribution layout and/or an alignment layout of the objects 602, such as based on the reposition input of a selected object from a user.

In this example 600 of the described techniques, the layout algorithm can determine a distribution layout of the objects in the vertical column 604, and position the column objects at equidistant spacing. The space between the distributed column objects in the vertical column 604 is displayed as positive space 606 that visually indicates the equidistance between the objects. For example, the space between the distributed column objects can be indicated visually as the positive space 606 by filling-in the space with a solid color, a line pattern, a graphic, and/or with any other visual indication of positive space to visually indicate the spatial relationships of the distributed objects. Additionally, distance measurements 608 can be displayed that numerically indicate the equidistance between the distributed column objects.

In addition to the column objects in the vertical column 604 being distributed equidistant from each other as displayed in the object layout interface 104, the layout algorithm can also determine an alignment layout of the objects, such as an edge-alignment layout and/or a center-alignment layout. For example, a user may initiate a reposition input 610 of the group of distributed column objects in the vertical column 604, and the layout algorithm determines the alignment layout of the displayed objects. As noted above, any edge of an object can be aligned with any edge of another displayed object, vertically and/or horizontally, where the center of any of the objects is also considered as an "edge" for alignment determinations. Generally on the horizontal plane, the top, horizontal center, and bottom edges of the objects can be snap-aligned in an alignment layout. Further, on the vertical plane, the left, vertical center, and right edges of the objects can be snap-aligned in an alignment layout. One or more of the vertical and/or horizontal edges of an object (to include the horizontal and vertical centers of the object) can be snap-aligned to one or more of the vertical and/or horizontal edges of any number of the other displayed objects.

In this example 600, at least one edge 612 (e.g., the top edge as displayed) of the middle column object 614 is aligned with respective edges 616 of one or more other objects 602 (e.g., the objects in a horizontal layout), and an alignment indication 618 for each instance of the selected middle column object 614 being aligned with the other objects can be displayed. For example, the alignment indication 618 is an edge line extending along the axis of the edge 612 of the middle column object 614 and the aligned edges 616 of other displayed objects 602. Although the alignment indication 618 is shown as a solid line of a black color, the alignment indication (e.g., the edge line) may be represented and displayed as solid or dashed line of various patterns, and in implementations, displayed in a different color or colors other than black.

Additionally, each instance of object alignment can include a distance measurement 620 that numerically indicates a distance between two objects along the aligned edges 612, 616 of the respective objects. Distance measurements are shown between the middle column object 614 and the closest neighboring objects on all sides. Alternatively or in addition, alignment indications 622 are displayed as center lines for each instance of object alignment extending through centers of the respective objects. As noted above, the alignment layout can be determined by the layout algorithm subsequent to a distribution layout, and the objects 602 can be distributed and then edge-aligned with the other displayed objects. Although the alignment indications 622 are shown as a dashed line of a black color, the alignment indications (e.g., the center lines) may be represented and displayed as solid or dashed lines of various patterns, and in implementations, displayed in a different color or colors other than black.

The multiple displayed objects 602 are also shown again at 624 to further illustrate the distance segment lines and the alignment segment lines that can also be displayed to visually indicate the alignment snapping of the objects. For example, the vertical alignment segment lines include a left edge alignment line 626, a right edge alignment line 628, and the vertical center line 630 (shown as a solid line rather than as a dashed line). The horizontal alignment segment lines include a top edge alignment line 632, a bottom edge alignment line 634, and the horizontal center line 636 (shown as a solid line rather than as a dashed line). Additionally, distance segment lines 638 and 640 are displayed to visually indicate the distance between the objects. In this example, the distance segment lines 638 and 640 are shown as thicker, gray colored lines to distinguish them from the thinner, black colored alignment segment lines.

Figure 7:
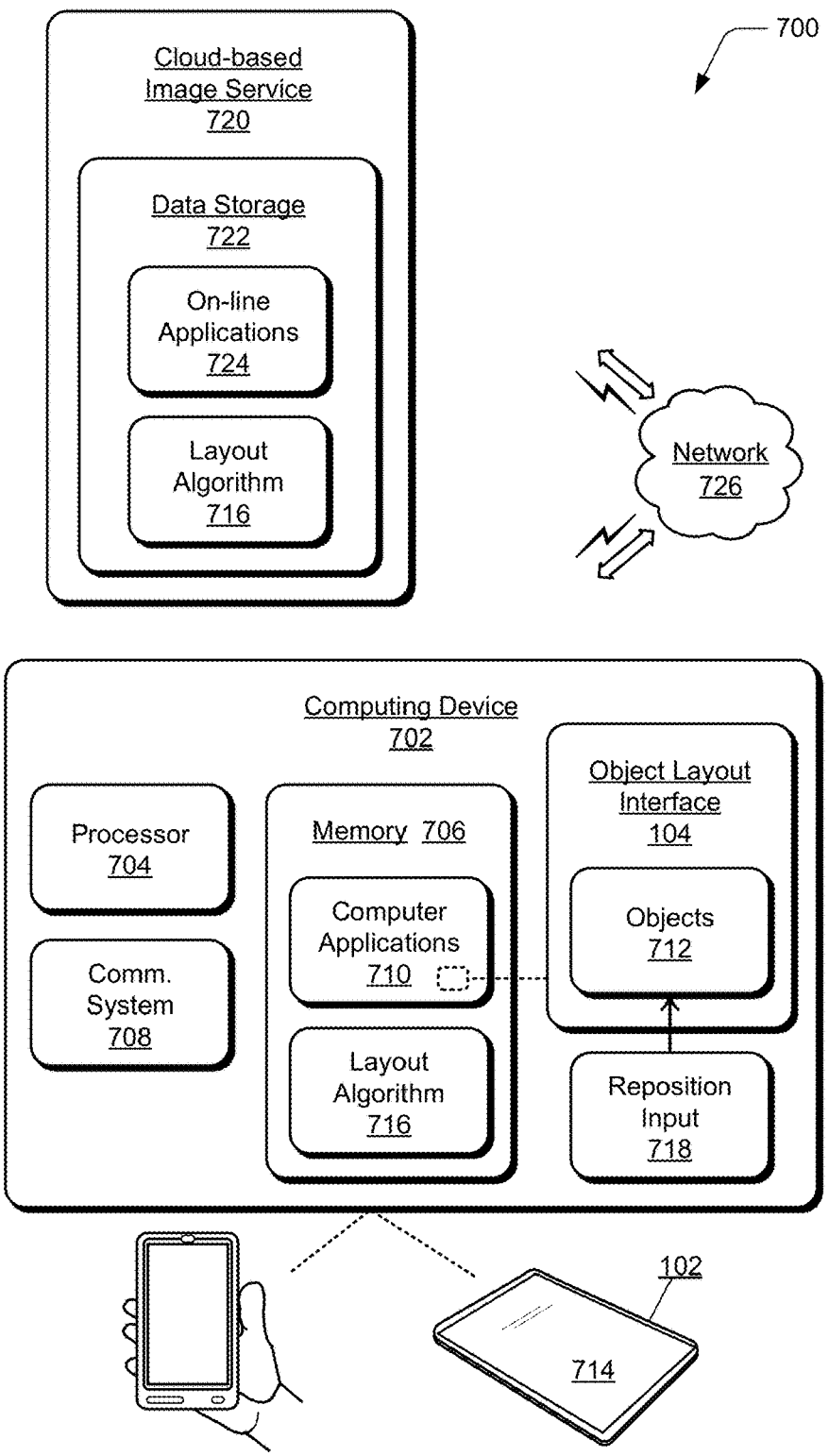
FIG. 7 illustrates an example system in which embodiments of objects alignment and distribution layout can be implemented.

FIG. 7 illustrates an example system 700 in which embodiments of objects alignment and distribution layout can be implemented. The example system 700 includes a computing device 702, such as the tablet device 102 shown in FIGS. 1-6, or any other type of a mobile phone, media playback, computing, communication, gaming, entertainment, portable electronic media device, or computer device. The computing device 702 can be implemented with various components, such as a processor 704 (or processing system) and memory 706, and with any number and combination of differing components as further described with reference to the example device shown in FIG. 12. Although not shown, the computing device 702 can include a power source, such as a battery, to power the various device components. Further, the computing device 702 can include different wireless radio systems, such as for Wi-Fi, Bluetooth™, Mobile Broadband, LTE, or any other wireless communication system or format. Generally, the computing device 702 implements a communication system 708 that includes a radio device, antenna, and chipset that is implemented for wireless communication with other devices, networks, and services.

The computing device 702 includes one or more computer applications 710 that generate the object layout interface 104, which includes objects 712 for display on a display device 714 of the computing device, as referred to above. The computer applications 710 can include many different types of computer applications that utilize or implement object layout features or functions, which provide for moving, repositioning, resizing, rotating, distributing, and aligning the objects, such as in drawing applications, for graphic design, publication layouts, artistic uses, commercial and private uses, etc.

Any of the different types of computer applications can include the layout algorithm 716 that implements embodiments of objects alignment and distribution layout, as illustrated and described above with reference to FIGS. 1-6. The layout algorithm 716 can be implemented as a software application or module, such as computer-executable software instructions that are executable with the processor 704 (or with a processing system) to implement embodiments described herein. The layout algorithm 716 can be stored on computer-readable storage memory (e.g., the device memory 706), such as any suitable memory device or electronic data storage implemented in the computing device. Although shown as a separate module or component in memory 706, the layout algorithm 716 may be integrated as a module or component with any of the computer applications 710 for objects alignment and distribution layout in the object layout interface 104.

As described with reference to FIGS. 1-6, the layout algorithm 716 is implemented to receive a reposition input 718 (e.g., a user input via the object layout interface) that repositions or moves a selected object 712 in the object layout interface 104. The layout algorithm 716 determines an alignment layout and/or a distribution layout of the objects based on the reposition input 718 of the selected object. A reposition input can be received in the object layout interface 104 as a touch selection of the object (or group of objects), with an input device (e.g., a mouse or stylus) selection of the object, with keyboard arrow key inputs, or with other types of computer inputs to reposition an object 712 in the object layout interface.

In embodiments, the layout algorithm 716 can move or position a selected object 712 for accurate alignment and/or distribution with the other displayed objects. Based on a determined distribution layout of the objects, the layout algorithm 716 can position the selected object equidistant between at least two of the other displayed objects (as shown in FIG. 1), or at a distance from a closest one of the objects, where the distance is an equivalent distance of a space between the other two objects (as shown in FIGS. 2A and 2B). The layout algorithm positioning the selected object can include moving the selected object subsequent to a received reposition input (e.g., after the user reposition input is received). The layout algorithm may be limited in moving the selected object not more than a predefined number of pixels of the user interface display subsequent to the received reposition input. Further, the number of pixels that a selected object is allowed to move after a reposition input may be constrained based on the input method of the reposition input. As shown in the figures and described above, the space between the distributed objects can be displayed as positive space that visually indicates the equidistance between the objects, and a distance measurement can be displayed that numerically indicates the equidistance between the distributed objects.

In implementations, the layout algorithm 716 determines the distribution layout, and considers movement of each distributed object along each axis independently. The layout algorithm 716 can evaluate each of the objects 712 for distribution criteria, which includes: the objects that are identified as a distribution candidate displayed in the object layout interface 104; they overlap the selected object on the orthogonal axis (e.g., overlap in the y-axis when snapping along the x-axis); they begin and end on the same side of the selected object along the snap-alignment axis; the distance to be snapped is the distance from an edge of the selected object to the closest candidate object edge (e.g., when alignment snapping a left edge, the closest candidate right edge matching the above criteria); and the candidate object distances are between opposite edges of successive snap candidates on the snap-alignment axis (e.g., right and left edges when alignment snapping along the x-axis).

The layout algorithm 716 is also implemented to evaluate successive object distribution candidates, which are two objects that are displayed adjacent in the object layout interface 104, but not overlapping on the distribution snap axis. The selected object is allowed to move a maximum distance in screen pixels along the snapped axis in order to have the same distance to its closest neighbor as two distribution object candidates have from each other, and the layout algorithm chooses the smallest such distance, if any. If the layout algorithm determines matching object candidates on both sides of the distribution snap axis, the layout algorithm 716 selects the distribution snapping with the smallest delta from the current position. If the distance of the matching object candidates are equal, then the layout algorithm can keep both of the object candidates. As described above, any of the displayed objects may be distributed based on the center, top, left, right, and/or bottom edges (e.g., potentially all at the same time). Further, the layout algorithm 716 can distribute an object along both sides of the same axis if the minimal movement delta for both sides would put the object in the same position.

In addition to the objects 712 being distributed for display in the object layout interface, the layout algorithm 716 can also determine an alignment layout of the objects based on the reposition input 718 of a selected object. The layout algorithm 716 can align a selected object with multiple ones of the other displayed objects and position at least one edge of the selected object in alignment along an axis with an edge of each of the other displayed objects. The alignment layout can be determined by the layout algorithm 716 subsequent to the distribution layout, and the objects 712 can be distributed and then edge-aligned. An alignment indication for each instance of a selected object being aligned along an axis with an edge of each of the other objects can also be displayed, such as an edge line extending along the axis of the edge of a selected object and an aligned edge of each of the multiple objects. Additionally, the alignment indication for each instance of object alignment can include a distance measurement that numerically indicates a distance between the aligned objects along the axis of the aligned edges of the respective objects. Alternatively or in addition, the alignment indication for each instance of object alignment is a center line extending through centers of the respective objects.

In implementations, the layout algorithm 716 determines the alignment layout, and positions a selected object so that an edge or edges of the object align with other object alignment candidates. The layout algorithm 716 can move a selected object to the extent that the edges or center of the object will be aligned with other displayed objects along an axis. For example, a rectangle object may move to the right an additional two pixels of the display interface to align with the right edge of an object snap candidate (e.g., another of the displayed objects). For all of the potential object alignment matches, the layout algorithm 716 can select the alignment with minimal deltas from the current position, and each axis is considered independently. As noted above, the layout algorithm 716 can be implemented to determine the distribution layout before an alignment layout to equally distribute the displayed objects that can be distributed, and then evaluate for alignment object candidates. For a distribution of objects along a particular axis, one or more of the distributed objects can then be aligned if the objects are not moved on the particular axis.

In implementations, the layout algorithm 716 can initiate the object layout interface to display all of the object distribution and alignment matches in a concise manner that provides complete visual relationships of object positions, without a user having to guess what may have been omitted. The distance measurements can be displayed for all object distribution and alignment matches, even for multiple matches that occur along the same axis for the alignment or distribution layouts. Further, the distance measurements can be displayed for alignment layouts and distribution layouts in all four directions at once. If a particular object is restricted from additional movement along an axis (e.g., distribution layout has occurred, or during a keyboard arrow key input), the alignment indications can still display whether or not an object is aligned with other alignment object candidates. Further, the distribution and alignment determinations of the layout algorithm 716 are consistent across different forms of interaction, such as for keyboard arrow key inputs, a computer input device (e.g., a mouse or stylus), and when a user initiates to move, resize, reposition, or draw the objects.

The alignment indications can be implemented to display in different colors and dimensions to highlight the object distribution and alignment matches, which is also effective to minimize the visual impact on the design, yet clearly highlight the object match referred to by each alignment indication. Further, the distance measurements can be displayed as just one set of distance annotations along any given side, which minimizes the number of displayed distance measurements while still displaying the most relevant information. Additionally, annotating the space between objects for distribution snapping clearly identifies the different forms of distribution and alignment snapping, and displays the distance annotations at a display position that won't be clipped from view or overlap other items displayed in the object layout interface. The alignment snapping distance measurements can also collapse to a single line when multiple matched object edges share the same axis coordinate, and the distance measurement is made to the closest object.

The example system 700 can also include a cloud-based image service 720, such as Adobe Creative Cloud™ that is accessible by client devices, to include the computing device 702 and the tablet device 102. The image service 720 includes data storage 722 that may be implemented as any suitable memory, memory device, or electronic data storage for network-based data storage. The data storage can maintain an instance of the layout algorithm 716, as well as on-line applications 724 (e.g., as network-based applications), that are accessible by a computer application 710 from the computing device 702.

The cloud-based image service 720 can also be implemented with server devices that are representative of one or multiple hardware server devices of the image service. Further, the cloud-based image service 720 can be implemented with various components, such as a processing system and memory, as well as with any number and combination of differing components as further described with reference to the example device shown in FIG. 12 to implement the services, applications, servers, and other features of objects alignment and distribution layout.

The example system 700 also includes a network 726, and any of the devices, servers, and/or services described herein can communicate via the network, such as for data communication between the computing device 702 and the cloud-based image service 720. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

Example methods 800, 900, 1000, and 1100 are described with reference to respective FIGS. 8-11 in accordance with one or more embodiments of objects alignment and distribution layout. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 8:
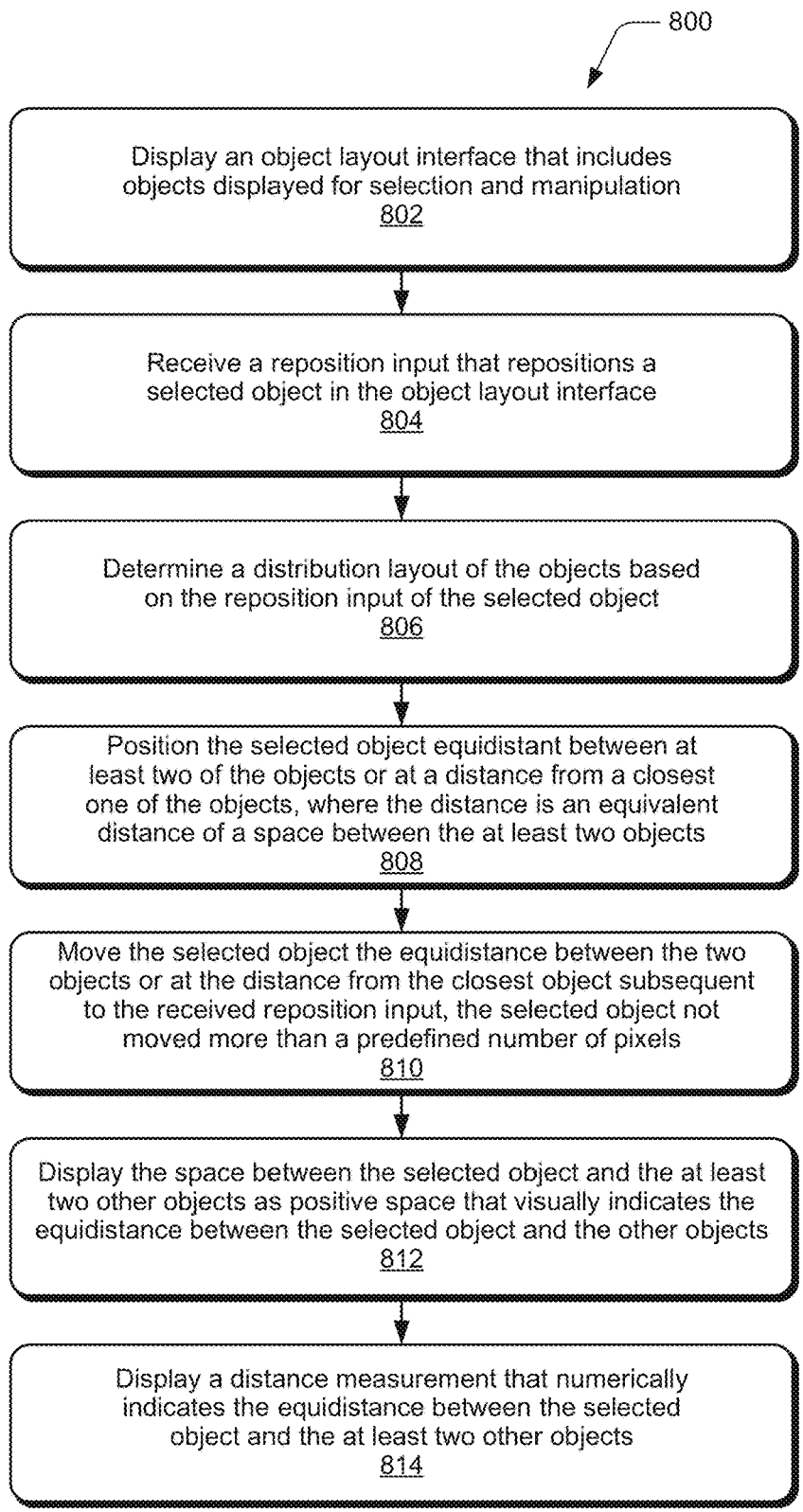
FIGS. 8-11 illustrate example methods of objects alignment and distribution layout in accordance with one or more embodiments of the techniques described herein.

FIG. 8 illustrates example method(s) 800 of objects alignment and distribution layout, and is generally described with reference to the layout algorithm implemented by the computing device as shown in the example system of FIG. 7. The order in which the method is described is not intended to be construed as a limitation, and any number or combination of the method operations can be combined in any order to implement a method, or an alternate method.

At 802, an object layout interface is displayed that includes objects displayed for selection and manipulation. For example, the tablet device 102 (shown in FIGS. 1-7) is a computing device that displays the object layout interface 104 of a computer application 710 that is implemented by the computing device, and the object layout interface 104 displays objects 106, 108 (FIG. 1) for user selection and manipulation, such as to select and reposition or move a displayed object in the object layout interface.

At 804, a reposition input is received that repositions a selected object in the object layout interface. For example, the layout algorithm 716 that is implemented by the tablet device 102 (e.g., as an example of the computing device 702) receives the reposition input 110 as a user input that repositions the selected object 108 in the object layout interface. The reposition input 110 can be received as a touch selection of the object 108 in the object layout interface 104, from an input device (e.g., a mouse or stylus) selection of the object, with keyboard arrow key inputs, or with other types of computer inputs to reposition the object 108 for display in the layout.

At 806, a distribution layout of the objects is determined based on the reposition input of the selected object. For example, the layout algorithm 716 determines the distribution layout of the objects 106, 108 in the object layout interface 104 based on the reposition input 110 of the selected object 108. Similarly, the layout algorithm 716 determines the distribution layout of the objects 204, 206 (FIG. 2A) based on the reposition input 208 of the selected object 206, and determines the distribution layout of the objects 216, 218, and 220 (FIG. 2B) based on the reposition input 222 of the selected object 220. Further, the layout algorithm 716 can determine the distribution layout of a selected object group based on a group reposition input of the selected object group.

At 808, the selected object is positioned, based on the determined distribution layout of the objects, equidistant between at least two of the objects or at a distance from a closest one of the objects, where the distance is an equivalent distance of a space between the at least two objects. For example, given the user reposition input 110 of the selected object 108 (in FIG. 1), the layout algorithm 716 positions the selected object 108 equidistant between the other two objects 106 based on the determined distribution layout of the objects 106, 108 in the object layout interface 104. Further, given the user reposition input 208 of the selected object 206 (in FIG. 2A), the layout algorithm 716 positions the selected object 206 at the distance 212 from the closest one of the objects 204, and the distance 212 is an equivalent distance of the space between the other two displayed objects 202. Similarly, given the user reposition input 222 of the selected object 220 (in FIG. 2B), the layout algorithm 716 positions the selected object 220 at the distance 226 from the closest one of the objects 218, and the distance 226 is an equivalent distance of the space between the two displayed objects 216 and 218. For a selected object group, the layout algorithm 716 can also position the selected object group equidistant between at least two non-selected objects based on the determined distribution layout of the selected object group and the non-selected objects, or at a distance from a closest one of the objects.

At 810, the selected object is moved the equidistance between the two objects or at the distance from the closest object subsequent to the received reposition input, the selected object not moved more than a predefined number of pixels from the resultant position of the reposition input. For example, the layout algorithm 716 can move the selected object 108 subsequent to the received reposition input 110 (e.g., after the user reposition input is received), and the layout algorithm may be limited in moving the selected object 108 not more than a predefined number of pixels of the user interface display subsequent to the received reposition input. The reposition input 110 that is received as a user selection of the object 108 will generally reposition the object so that it is approximately aligned and/or distributed with the other displayed objects in the object layout interface. In the event that the reposition input 110 of the selected object 108 as initiated by the user does not exactly align and/or distribute the objects 106, 108, the layout algorithm can then further move or position the object 108 for accurate alignment and/or distribution with the other displayed objects 106.

At 812, the space between the selected object and the at least two objects is displayed as positive space that visually indicates the equidistance between the selected object and each of the at least two objects. For example, the space between the selected object 108 and the other distributed objects 106 is displayed as the positive space 114 that visually indicates the equidistance between the objects. The positive space 114 can be indicated visually by filling-in the space with a solid color, a line pattern, a graphic, and/or with any other visual indication of positive space to indicate the spatial relationships of the distributed objects. At 814, a distance measurement is displayed that numerically indicates the equidistance between the selected object and each of the at least two objects. For example, the distance measurements 116 are also displayed that numerically indicate the equidistance between the selected object 108 and each of the other distributed objects 106 that the selected object is distributed next to or between.

Figure 9:
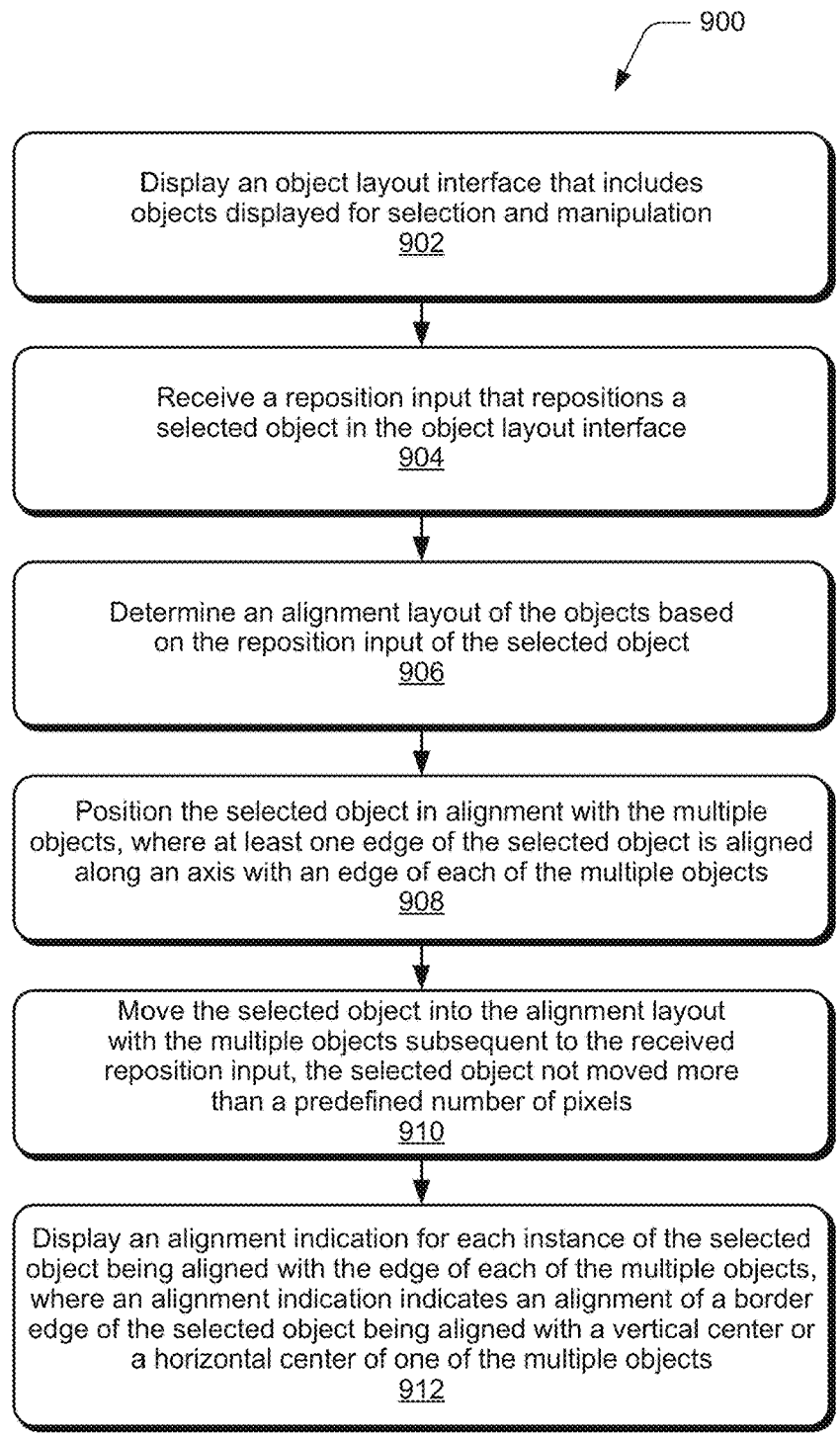

FIG. 9 illustrates example method(s) 900 of objects alignment and distribution layout, and is generally described with reference to the layout algorithm implemented by the computing device as shown in the example system of FIG. 7. The order in which the method is described is not intended to be construed as a limitation, and any number or combination of the method operations can be combined in any order to implement a method, or an alternate method.

At 902, an object layout interface is displayed that includes objects displayed for selection and manipulation. For example, the tablet device 102 (shown in FIGS. 1-7) is a computing device that displays the object layout interface 104 of a computer application 710 that is implemented by the computing device, and the object layout interface 104 displays objects 402, 404 (FIG. 4) for user selection and manipulation, such as to select and reposition or move a displayed object in the object layout interface. Similarly, the object layout interface 104 displays objects 502-506 (FIG. 5A), displays objects 518-522 (FIG. 5B), and displays objects 534-540 (FIG. 5C) for user selection and manipulation.

At 904, a reposition input is received that repositions a selected object in the object layout interface. For example, the layout algorithm 716 that is implemented by the tablet device 102 (e.g., as an example of the computing device 702) receives the reposition input 406 as a user input that repositions the selected object 404 in the object layout interface. The reposition input 110 can be received as a touch selection of the object 404 in the object layout interface 104, from an input device (e.g., a mouse or stylus) selection of the object, with keyboard arrow key inputs, or with other types of computer inputs to reposition the object 404 for display in the layout. Similarly, the reposition inputs 508, 524, and 542 in respective FIGS. 5A, 5B, and 5C can be received as the shown touch selections of the selected objects in the object layout interface 104.

At 906, an alignment layout of the objects is determined based on the reposition input of the selected object. For example, the layout algorithm 716 determines the alignment layout of the objects 402, 404 in the object layout interface 104 based on the reposition input 406 of the selected object 404. Similarly, the layout algorithm 716 determines the alignment layout of the objects 502, 504, and 506 (FIG. 5A) based on the reposition input 508 of the selected object 504, determines the alignment layout of the objects 518, 520, and 522 (FIG. 5B) based on the reposition input 524 of the selected object 520, and determines the alignment layout of the objects 534, 536, 538, and 540 (FIG. 5C) based on the reposition input 542 of the selected object 536. Further, the layout algorithm 716 can determine the alignment layout of a selected object group based on a group reposition input of the selected object group.

At 908, the selected object is positioned, based on the determined alignment layout of the objects, in alignment with the multiple objects, where at least one edge of the selected object is aligned along an axis with an edge of each of the multiple objects. For example, given the user reposition input 406 of the selected object 404 (in FIG. 4), the layout algorithm 716 positions the selected object 404 in alignment with multiple ones of the objects 402 based on the determined alignment layout of the objects 402, 404 in the object layout interface 104. Further, given the user reposition input 508 of the selected object 504 (in FIG. 5A), the layout algorithm 716 positions the selected object 504 in alignment with the objects 502, 506 in the object layout interface 104 based on the determined alignment layout of the objects. Similarly, given the user reposition input 524 of the selected object 520 (in FIG. 5B), the layout algorithm 716 positions the selected object 520 in alignment with the objects 518, 522 in the object layout interface 104 based on the determined alignment layout of the objects. Similarly, given the user reposition input 542 of the selected object 536 (in FIG. 5C), the layout algorithm 716 positions the selected object 536 in alignment with the objects 534, 538, and 540 in the object layout interface 104. The selected object 536 is aligned along the horizontal border edge 544 of the selected object with border edges (e.g., the horizontal top edges) of the objects 534 and 538. Further, the selected object 536 is aligned along the vertical border edge 548 of the selected object with the vertical center 550 of the object 540. For a selected object group, the layout algorithm 716 aligns the selected object group with other non-selected objects based on the determined alignment layout of the selected object group and the non-selected objects.

At 910, the selected object is moved into the alignment layout with the multiple objects subsequent to the received reposition input, the selected object not moved more than a predefined number of pixels from the resultant position of the reposition input. For example, the layout algorithm 716 can move the selected object 404 subsequent to the received reposition input 406 (e.g., after the user reposition input is received), and the layout algorithm may be limited in moving the selected object 404 not more than a predefined number of pixels of the user interface display subsequent to the received reposition input. The reposition input 406 that is received as a user selection of the object 404 will generally reposition the object so that it is approximately aligned and/or distributed with the other displayed objects in the object layout interface. In the event that the reposition input 406 of the selected object 404 as initiated by the user does not exactly align and/or distribute the objects 402, 404 the layout algorithm can then further move or position the object 404 for accurate alignment and/or distribution with the other displayed objects 402.

At 912, an alignment indication is displayed for each instance of the selected object being aligned with the edge of each of the multiple objects, where an alignment indication indicates an alignment of a border edge of the selected object being aligned with a vertical center or a horizontal center of one of the multiple objects. For example, the alignment indications 410 are displayed for each instance of object alignment as an edge line extending along the axis of the at least one edge of the selected object 404 and the aligned edges 312 of each of the multiple objects. Additionally, the alignment indication for each instance of object alignment includes the distance measurements 414 that numerically indicate a distance between the selected object 404 and an aligned object 402 along the axis of the aligned edges 412 of the respective objects. Alternatively or in addition, an alignment indication 418 for each instance of object alignment is a center line extending through the centers of the selected object 404 and the aligned objects 402. In another example, the alignment indications 546, 552 (FIG. 5C) are displayed for each instance of the selected object 536 being aligned with the edge or edges of one or more of the other displayed objects 534, 538, and 540, where the center of any of the objects is also considered as an "edge" for alignment determinations. The alignment indication 552 (e.g., a center line) is displayed as an indication of the border edge 548 of the selected object 536 being aligned with the vertical center 550 of the displayed object 540.

Figure 10:
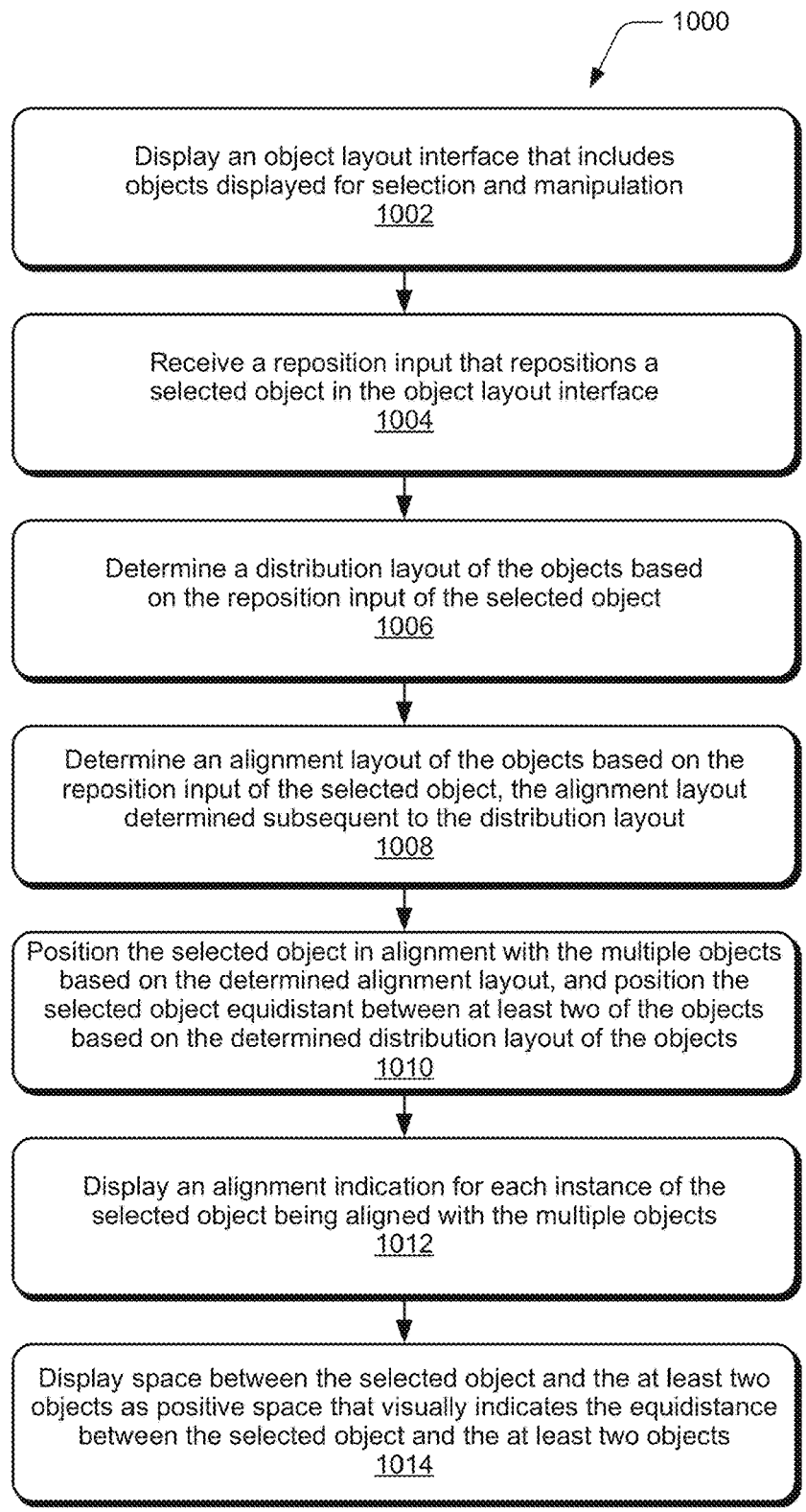

FIG. 10 illustrates example method(s) 1000 of objects alignment and distribution layout, and is generally described with reference to the layout algorithm implemented by the computing device as shown in the example system of FIG. 7. The order in which the method is described is not intended to be construed as a limitation, and any number or combination of the method operations can be combined in any order to implement a method, or an alternate method.

At 1002, an object layout interface is displayed that includes objects displayed for selection and manipulation. For example, the tablet device 102 (shown in FIGS. 1-7) is a computing device that displays the object layout interface 104 of a computer application 710 that is implemented by the computing device, and the object layout interface 104 displays objects 602, 614 (FIG. 4) for user selection and manipulation, such as to select and reposition or move a displayed object in the object layout interface.

At 1004, a reposition input is received that repositions a selected object in the object layout interface. For example, the layout algorithm 716 that is implemented by the tablet device 102 (e.g., as an example of the computing device 702) receives the reposition input 610 as a user input that repositions the group of selected objects in the vertical column 604 shown displayed in the object layout interface 104. The reposition input 610 can be received as a touch selection of the object group in the object layout interface 104, from an input device (e.g., a mouse or stylus) selection of the object group, with keyboard arrow keys inputs, or with other types of computer inputs to reposition the object group for display in the layout.

At 1006, a distribution layout of the objects is determined based on the reposition input of the selected object. For example, the layout algorithm 716 determines the distribution layout of the objects 602 in the vertical column 604, and positions the column objects at equidistant spacing. At 1008, an alignment layout of the objects is determined based on the reposition input of the selected object, the alignment layout determined subsequent to the distribution layout of the objects. For example, the layout algorithm 716 also determines an alignment layout of the objects 602 in the object layout interface 104, where at least one edge 612 of the middle column object 614 is aligned with edges 616 of one or more of the other objects 602 (e.g., the objects in a horizontal layout). Additionally, a center of the middle column object 614 is aligned with the vertical and/or horizontal centers of one or more of the other objects 602.

At 1010, the selected object is positioned in alignment with the multiple objects based on the determined alignment layout, and the selected object is positioned equidistant between at least two of the objects based on the determined distribution layout of the objects. For example, the layout algorithm 716 positions the group of distributed objects in the vertical column 604 so that the middle column object 614 is distributed and aligned with other ones of the objects in the object layout interface 104.

At 1012, an alignment indication is displayed for each instance of the selected object being aligned with the multiple objects. For example, each instance of object alignment includes the distance measurements 620 that numerically indicate the distance between two objects along the aligned edges 612, 616 of the respective objects, where the distance measurements are shown between the middle column object 614 and the closest neighboring objects 602 on all sides. Alternatively or in addition, the alignment indications 622 are displayed as the center lines for each instance of object alignment extending through centers of the respective objects.

At 1014, space between the selected object and the at least two objects is displayed as positive space that visually indicates the equidistance between the selected object and each of the at least two objects. For example, the space between the distributed column objects in the vertical column 604 is displayed as positive space 606 that visually indicates the equidistance between the objects. The positive space 606 can be visually indicated by a filled-in solid color, a line pattern, a graphic, and/or with any other visual indication of positive space that indicates the spatial relationships of the distributed objects. Additionally, the distance measurements 608 are displayed that numerically indicate the equidistance between the distributed column objects.

Figure 11:
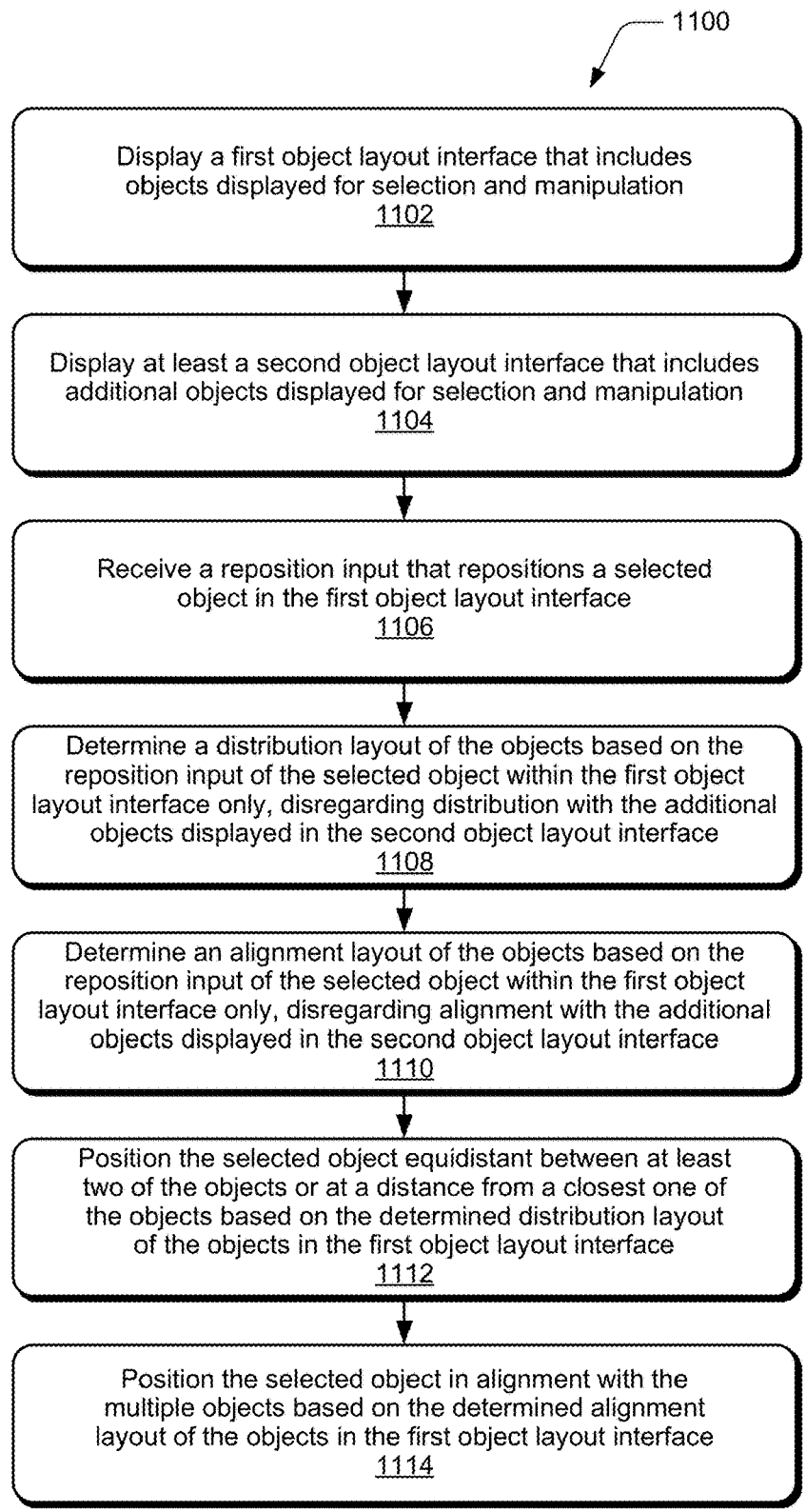

FIG. 11 illustrates example method(s) 1100 of objects alignment and distribution layout, and is generally described with reference to the layout algorithm implemented by the computing device as shown in the example system of FIG. 7. The order in which the method is described is not intended to be construed as a limitation, and any number or combination of the method operations can be combined in any order to implement a method, or an alternate method.

At 1102, a first object layout interface is displayed that includes objects displayed for selection and manipulation. For example, the tablet device 102 (shown in FIGS. 1-7) is a computing device that displays the object layout interface 104 of a computer application 710 that is implemented by the computing device, and the object layout interface 104 displays objects 106, 108 for user selection and manipulation, such as to select and reposition or move a displayed object in the object layout interface. At 1104, at least a second object layout interface is displayed that includes additional objects displayed for selection and manipulation. For example, a computing device may display a second object layout interface of the computer application 710 that also displays additional objects (e.g., different objects than those displayed in the first object layout interface 104). As indicated, the first and second object layout interfaces, also referred to as "visual boards", are generated by the computer application in the same layout instance, but each have independent objects displayed for selection and manipulation.

At 1106, a reposition input is received that repositions a selected object in the first object layout interface. For example, the layout algorithm 716 that is implemented by the tablet device 102 (e.g., as an example of the computing device 702) receives the reposition input 110 as a user input that repositions the selected object 108 in the first object layout interface 104. The reposition input 110 can be received as a touch selection of the object 108 in the first object layout interface 104, from an input device (e.g., a mouse or stylus) selection of the object, with keyboard arrow key inputs, or with other types of computer inputs to reposition the object 108 for display in the layout.

At 1108, a distribution layout of the objects is determined based on the reposition input of the selected object within the first object layout interface only, disregarding distribution with the additional objects displayed in the second object layout interface. For example, the layout algorithm 716 determines the distribution layout of the objects 106, 108 in the first object layout interface 104 based on the reposition input 110 of the selected object 108 disregarding distribution with any of the additional objects displayed in the second object layout interface (displayed at 1104).

At 1110, an alignment layout of the objects is determined based on the reposition input of the selected object within the first object layout interface only, disregarding alignment with the additional objects displayed in the second object layout interface. For example, the layout algorithm 716 determines the alignment layout of the objects 106, 108 in the first object layout interface 104 based on the reposition input 110 of the selected object 108 disregarding alignment with any of the additional objects displayed in the second object layout interface (displayed at 1104).

At 1112, the selected object is positioned equidistant between at least two of the objects or at a distance from a closest one of the objects based on the determined distribution layout of the objects in the first object layout interface. For example, given the user reposition input 110 of the selected object 108, the layout algorithm 716 positions the selected object 108 equidistant between the other two objects 106 based on the determined distribution layout of the objects 106, 108 in the first object layout interface 104, disregarding distribution with any of the additional objects displayed in the second object layout interface (displayed at 1104).

At 1114, the selected object is positioned in alignment with the multiple objects based on the determined alignment layout of the objects in the first object layout interface. For example, given the user reposition input 110 of the selected object 108, the layout algorithm 716 positions the selected object 108 in alignment with multiple ones of the objects 402 based on the determined alignment layout of the objects 106, 108 in the first object layout interface 104 (FIGS. 3A-B), disregarding distribution with any of the additional objects displayed in the second object layout interface (displayed at 1104).

Figure 12:
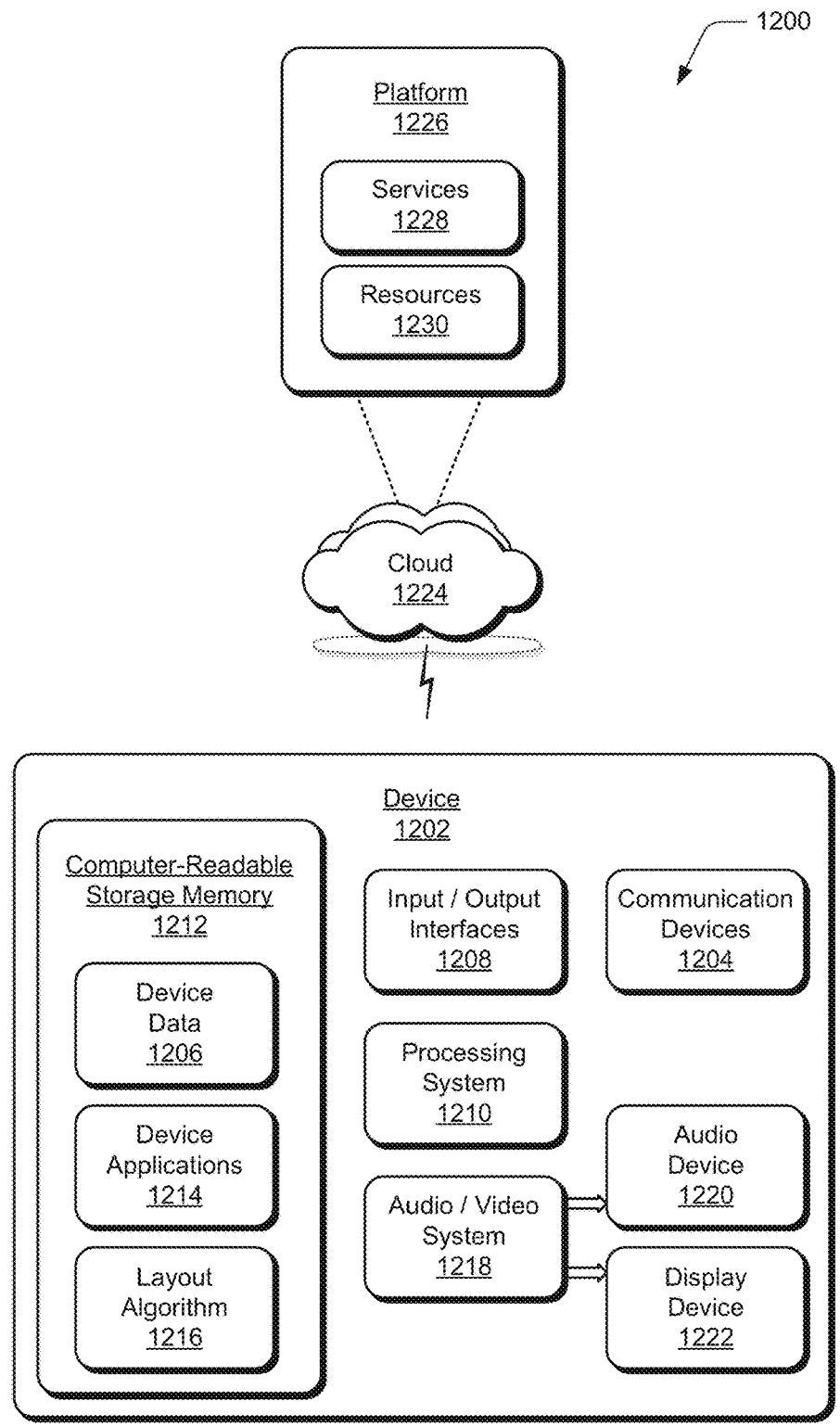
FIG. 12 illustrates an example system with an example device that can implement embodiments of objects alignment and distribution layout.

FIG. 12 illustrates an example system 1200 that includes an example device 1202, which can implement embodiments of objects alignment and distribution layout. The example device 1202 can be implemented as any of the computing devices and/or services (e.g., server devices) described with reference to the previous FIGS. 1-11, such as any type of computing device, client device, mobile phone, tablet, communication, entertainment, gaming, media playback, and/or other type of device. For example, the tablet device 102, the computing device 702, and/or server devices of the cloud-based image service 720 may be implemented as the example device 1202.

The device 1202 includes communication devices 1204 that enable wired and/or wireless communication of device data 1206, such as object layout interface data and computer applications content that is transferred from one computing device to another, and/or synched between multiple computing devices. The device data can include any type of audio, video, image, and/or graphic data that is generated by applications executing on the device. The communication devices 1204 can also include transceivers for cellular phone communication and/or for network data communication.

The device 1202 also includes input/output (I/O) interfaces 1208, such as data network interfaces that provide connection and/or communication links between the device, data networks, and other devices. The I/O interfaces can be used to couple the device to any type of components, peripherals, and/or accessory devices, such as a digital camera device that may be integrated with device 1202. The I/O interfaces also include data input ports via which any type of data, media content, and/or inputs can be received, such as user inputs to the device, as well as any type of audio, video, and/or image data received from any content and/or data source.

The device 1202 includes a processing system 1210 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1202 may further include any type of a system bus or other data and command transfer system that couples the various components within the device. A system bus can include any one or combination of different bus structures and architectures, as well as control and data lines.

The device 1202 also includes computer-readable storage memory 1212, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 1212 provides storage of the device data 1206 and various device applications 1214, such as an operating system that is maintained as a software application with the computer-readable storage memory and executed by the processing system 1210. In this example, the device applications also include various computer applications and a layout algorithm 1216 that implements embodiments of objects alignment and distribution layout, such as when the example device 1202 is implemented as the computing device 702 shown in FIG. 7. Examples of the layout algorithm 1216 includes the layout algorithm 716 that is implemented by the computing device 702 and/or by the cloud-based image service 720, as described with reference to FIG. 7.

The device 1202 also includes an audio and/or video system 1218 that generates audio data for an audio device 1220 and/or generates display data for a display device 1222. The audio device and/or the display device include any devices that process, display, and/or otherwise render audio, video, display, and/or image data, such as the image content of a digital photo. In implementations, the audio device and/or the display device are integrated components of the example device 1202. Alternatively, the audio device and/or the display device are external, peripheral components to the example device. In embodiments, at least part of the techniques described for objects alignment and distribution layout may be implemented in a distributed system, such as over a "cloud" 1224 in a platform 1226. The cloud 1224 includes and/or is representative of the platform 1226 for services 1228 and/or resources 1230. For example, the services 1228 may include the cloud-based image service described with reference to FIG. 7.

The platform 1226 abstracts underlying functionality of hardware, such as server devices (e.g., included in the services 1228) and/or software resources (e.g., included as the resources 1230), and connects the example device 1202 with other devices, servers, etc. The resources 1230 may also include applications and/or data that can be utilized while computer processing is executed on servers that are remote from the example device 1202. Additionally, the services 1228 and/or the resources 1230 may facilitate subscriber network services, such as over the Internet, a cellular network, or Wi-Fi network. The platform 1226 may also serve to abstract and scale resources to service a demand for the resources 1230 that are implemented via the platform, such as in an interconnected device embodiment with functionality distributed throughout the system 1200. For example, the functionality may be implemented in part at the example device 1202 as well as via the platform 1226 that abstracts the functionality of the cloud 1224.

Although embodiments of objects alignment and distribution layout have been described in language specific to features and/or methods, the appended claims are not necessarily limited to the specific features or methods described. Rather, the specific features and methods are disclosed as example implementations of objects alignment and distribution layout, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method of objects alignment and distribution layout in an object layout interface as implemented in a digital environment performed by a layout module implemented at least partially in hardware of a computing device, the method comprising:
    displaying the object layout interface that includes objects displayed for selection and manipulation;
    receiving a reposition input that repositions a selected object in the object layout interface;
    determining a distribution layout of the objects based on the reposition input of the selected object;
    positioning, based on the determined distribution layout of the objects, the selected object equidistant between at least two of the objects or at a distance from a closest one of the objects, the distance being an equivalent distance of a space between the at least two objects; and
    displaying the space between the selected object and the at least two objects as positive space that visually indicates the equidistance between the selected object and the at least two objects.

2. The method as recited in claim 1, further comprising:
displaying a distance measurement that numerically indicates the equidistance between the selected object and the at least two objects.

3. The method as recited in claim 1, wherein said receiving the reposition input as one or more keyboard arrow keys inputs, and the method further comprising:
displaying a distribution indication of the space between the selected object and the at least two objects based on a keyboard arrow key input that positions the selected object the equidistance between the at least two objects or at the distance from the closest object.

4. The method as recited in claim 1, wherein the positioning includes moving the selected object the equidistance between the at least two objects or at the distance from the closest object subsequent to the received reposition input.

5. The method as recited in claim 4, wherein said moving the selected object not more than a predefined number of pixels subsequent to the received reposition input.

6. The method as recited in claim 1, further comprising:
determining an alignment layout of the objects based on the reposition input of the selected object, wherein at least one edge of the selected object is aligned with an edge of at least one of the other objects; and
wherein the alignment layout is determined subsequent to the distribution layout, the selected object being distributed and then edge-aligned with the at least one other object.

7. The method as recited in claim 6, wherein:
the edges of an object include vertical edges, a vertical center, horizontal edges, and a horizontal center of the object; and
the selected object is edge-aligned with the at least one other object based on any one or more of the edges of the selected object being aligned with any one or more of the edges of the at least one other object.

8. The method as recited in claim 1, further comprising:
receiving a group reposition input that repositions a selected object group of the objects displayed in the object layout interface;
determining the distribution layout of the selected object group based on the group reposition input of the selected object group; and
positioning, based on the determined distribution layout of the objects, the selected object group equidistant between at least two non selected objects or at the distance from a closest one of the non-selected objects, wherein the space between the selected object group and the at least two non-selected objects is displayed as the positive space.

9. The method as recited in claim 1, further comprising:
displaying an additional object layout interface that includes additional objects displayed for selection and manipulation; and
said determining the distribution layout of the objects based on the reposition input of the selected object within the object layout interface only, disregarding distribution with the additional objects displayed in the additional object layout interface.

10. A method of objects alignment and distribution layout in an object layout interface as implemented in a digital environment performed by a layout module implemented at least partially in hardware of a computing device, the method comprising:
displaying the object layout interface that includes objects displayed for selection and manipulation;
receiving a reposition input that repositions a selected object in the object layout interface;
determining an alignment layout of the objects based on the reposition input of the selected object;
positioning the selected object in alignment with multiple ones of the objects based on the determined alignment layout of the objects, at least one edge of the selected object being aligned along an axis with an edge of each of the multiple objects; and
displaying an alignment indication for each instance of the selected object being aligned with the edge of each of the multiple objects, at least one of the alignment indications indicating an alignment of a border edge of the selected object being aligned with a vertical center or a horizontal center of one of the multiple objects.

11. The method as recited in claim 10, wherein:
the alignment indication for each instance of object alignment is an edge line extending along the axis of the at least one edge of the selected object and the aligned edge of each of the multiple objects; and
the method further comprising minimizing display items on the object layout interface by combining overlapping ones of the edge lines.

12. The method as recited in claim 10, wherein the alignment indication for each instance of object alignment is a distance measurement that numerically indicates a distance between the selected object and each of the multiple objects along the axis of the aligned edges of the respective objects.

13. The method as recited in claim 10, wherein:
the alignment indication for each instance of object alignment is an edge line extending along the axis of the at least one edge of the selected object and the aligned edge of each of the multiple objects; and
the alignment indication including a distance measurement that numerically indicates a distance between the selected object and each of the multiple objects along the axis of the aligned edges of the respective objects.

14. The method as recited in claim 10, wherein:
the edges of an object include vertical edges, a vertical center, horizontal edges, and a horizontal center of the object;
the border edge of the selected object is one of the vertical edges or one of the horizontal edges of the selected object; and
the selected object is edge-aligned with the multiple objects based on any one or more of the edges of the selected object being aligned with any one or more of the edges of the multiple objects.

15. The method as recited in claim 10, wherein said receiving the reposition input as one or more keyboard arrow key inputs, and the method further comprising:
displaying the alignment indication for each instance of the selected object being aligned with the multiple objects based on a keyboard arrow key input that positions the selected object into the alignment layout with the multiple objects.

16. The method as recited in claim 10, wherein the positioning includes moving the selected object into the alignment layout with the multiple objects subsequent to the received reposition input.

17. The method as recited in claim 16, wherein said moving the selected object not more than a predefined number of pixels subsequent to the received reposition input.

18. The method as recited in claim 10, further comprising:
displaying an additional object layout interface that includes additional objects displayed for selection and manipulation; and
said determining the alignment layout of the objects based on the reposition input of the selected object within the object layout interface only, disregarding alignment with the additional objects displayed in the additional object layout interface.

19. A computing device implemented for objects alignment and distribution layout in an object layout interface, the computing device comprising:
a display device configured to display the object layout interface that includes objects displayed for selection and manipulation;
a memory and processor system configured to execute a layout algorithm as a computer application that is implemented to:
receive a reposition input that repositions a selected object in the object layout interface;
determine a distribution layout of the objects based on the reposition input of the selected object; position, based on the determined distribution layout of the objects, the selected object equidistant between at least two of the objects or at a distance from a closest one of the objects, the distance being an equivalent distance of a space between the at least two objects; and
display the space between the selected object and the at least two objects as positive space that visually indicates the equidistance between the selected object and the at least two objects.

20. The computing device as recited in claim 19, wherein the layout algorithm is further implemented to:
determine an alignment layout of the objects based on the reposition input of the selected object;
further position the selected object in alignment with the multiple ones of the objects based on the determined alignment layout of the objects, at least one edge of the selected object being aligned along an axis with an edge of each of the multiple objects; and
display alignment indications for each instance of the selected object being aligned with the edge of each of the multiple objects.

* * * * *